(12) United States Patent
Kurakami

(10) Patent No.: US 12,221,100 B2
(45) Date of Patent: Feb. 11, 2025

(54) VEHICLE CONTROL SYSTEM

(71) Applicant: SUBARU CORPORATION, Tokyo (JP)

(72) Inventor: Yuki Kurakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 228 days.

(21) Appl. No.: 17/492,742

(22) Filed: Oct. 4, 2021

(65) Prior Publication Data

US 2022/0105930 A1  Apr. 7, 2022

(30) Foreign Application Priority Data

Oct. 2, 2020 (JP) .................................. 2020-167603

(51) Int. Cl.
*B60W 30/12* (2020.01)
*B60W 50/00* (2006.01)
*B60W 50/14* (2020.01)

(52) U.S. Cl.
CPC ........ *B60W 30/12* (2013.01); *B60W 50/0097* (2013.01); *B60W 50/14* (2013.01); *B60W 2540/223* (2020.02); *B60W 2710/20* (2013.01)

(58) Field of Classification Search
None
See application file for complete search history.

(56) References Cited

U.S. PATENT DOCUMENTS

2009/0030613 A1* 1/2009 Kataoka ............... G06V 20/588
701/300
2012/0283911 A1* 11/2012 Lee ....................... B60W 30/12
701/41
(Continued)

FOREIGN PATENT DOCUMENTS

JP  2017-030518 A  2/2017
JP  2018-045500 A  3/2018
(Continued)

OTHER PUBLICATIONS

Japanese Office Action issued in corresponding JP Application No. 2020-167603, dated Feb. 27, 2024, related to U.S. Appl. No. 17/492,742, with machine translation.

*Primary Examiner* — Fadey S. Jabr
*Assistant Examiner* — Mario C Gonzalez
(74) *Attorney, Agent, or Firm* — TROUTMAN PEPPER LOCKE LLP

(57) ABSTRACT

A vehicle control system includes first to third prediction path generators, an assist travel controller, a divergence determining unit, a transition controller, and a travel path selector. The first prediction path generator generates a first prediction path of a vehicle based on map information and positional information of the vehicle. The second prediction path generator generates a second prediction path of the vehicle based on external environment information. The third prediction path generator generates a third prediction path based on the two prediction paths. The assist travel controller performs hands-off driving. The divergence determining unit determines whether a predetermined divergence has occurred between the two prediction paths. The transition controller performs a transition from the hands-off driving to hands-on driving in a case where the divergence has occurred. The travel path selector selects the third prediction path as a travel path of the vehicle during the transition.

13 Claims, 15 Drawing Sheets

(56) References Cited

U.S. PATENT DOCUMENTS

| | | | |
|---|---|---|---|
| 2015/0203109 A1* | 7/2015 | McClain | B60T 8/17557 |
| | | | 701/1 |
| 2016/0288790 A1* | 10/2016 | Aoki | G06V 20/584 |
| 2017/0132933 A1* | 5/2017 | Habu | B60Q 5/006 |
| 2018/0170377 A1* | 6/2018 | Tatsukawa | B60W 30/12 |
| 2018/0292834 A1* | 10/2018 | Kindo | G01C 21/3415 |
| 2019/0152523 A1* | 5/2019 | Hajika | B62D 6/005 |
| 2020/0184821 A1* | 6/2020 | Yamaoka | B60W 10/20 |
| 2020/0223449 A1* | 7/2020 | Tsuji | G08G 1/09626 |
| 2020/0269837 A1* | 8/2020 | Nath | B60W 60/0053 |
| 2020/0285233 A1* | 9/2020 | Hafner | B60W 30/12 |
| 2020/0385018 A1 | 12/2020 | Kameoka et al. | |
| 2021/0094574 A1 | 4/2021 | Lee et al. | |
| 2021/0107513 A1* | 4/2021 | Goto | B60W 30/09 |
| 2021/0269062 A1* | 9/2021 | Yasutomi | G06T 7/50 |

FOREIGN PATENT DOCUMENTS

| | | |
|---|---|---|
| JP | 2018-203006 A | 12/2018 |
| WO | 2019026210 A1 | 2/2019 |
| WO | 2019/180919 A1 | 9/2019 |
| WO | 2020002964 A1 | 1/2020 |

\* cited by examiner

VEHICLE CONTROL SYSTEM

CROSS-REFERENCE TO RELATED APPLICATION

The present application claims priority from Japanese Patent Application No. 2020-167603 filed on Oct. 2, 2020, the entire contents of which are hereby incorporated by reference.

BACKGROUND

The disclosure relates to driving support devices related to vehicles. In particular, the disclosure relates to the technical field of a driving support device that selects an appropriate travel path.

Technologies related to automated driving of vehicles are being developed. One example is hands-free driving. In order to perform such automated driving appropriately, it is desirable that the travel lane of the subject vehicle be appropriately recognized.

For example, PCT International Publication No. WO 2019/180919 A1 discloses a technology for generating travel paths in a plurality of patterns if a lane with high reliability varies from sensor to sensor in an area where a lane splits into multiple lanes, such as at an intersection of a road, and setting the reliability of each path relative to the degree by which variations in the paths are within a predetermined range.

SUMMARY

An aspect of the disclosure provides a vehicle control system to be applied to a vehicle. The vehicle control system including a first prediction path generator, a second prediction path generator, a third prediction path generator, an assist travel controller, a divergence determining unit, a transition controller, and a travel path selector. The first prediction path generator is configured to generate, as a first prediction path, a prediction path of the vehicle based on map information and positional information of the vehicle. The second prediction path generator is configured to generate, as a second prediction path, the prediction path of the vehicle based on external environment information. The external environment information is acquired from an external environment recognizer configured to recognize an external travel environment of the vehicle. The third prediction path generator is configured to generate a third prediction path based on the first prediction path and the second prediction path. The assist travel controller is configured to perform hands-off driving in which a driver who drives the vehicle is not to perform steering or course-keeping. The divergence determining unit is configured to determine whether a divergence of a predetermined amount or more has occurred between the first prediction path and the second prediction path. The transition controller is configured to perform a transition from the hands-off driving to hands-on driving in a case where the divergence determining unit determines that the divergence of the predetermined amount or more has occurred between the first prediction path and the second prediction path. The travel path selector is configured to select the third prediction path as a travel path of the vehicle during the transition from the hands-off driving to the hands-on driving.

An aspect of the disclosure provides a vehicle control system to be applied to a vehicle. The vehicle control system includes circuitry. The circuitry is configured to generate a first prediction path of the vehicle based on map information and positional information of the vehicle. The circuitry is configured to generate a second prediction path of the vehicle based on external environment information. The external environment information is acquired from an external environment recognizer configured to recognize an external travel environment of the vehicle. The circuitry is configured to generate a third prediction path based on the first prediction path and the second prediction path. The circuitry is configured to perform hands-off driving in which a driver who drives the vehicle is not to perform steering or course-keeping. The circuitry is configured to determine whether a divergence of a predetermined amount or more has occurred between the first prediction path and the second prediction path. The circuitry is configured to perform a transition from the hands-off driving to hands-on driving in a case where the determination result indicates that the divergence of the predetermined amount or more has occurred between the first prediction path and the second prediction path. The circuitry is configured to select the third prediction path as a travel path of the vehicle during the transition from the hands-off driving to the hands-on driving.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the method disclosed in WO 2019/180919 A1, a vehicle may possibly travel on a path significantly different from an optimal path if the calculated reliability is incorrect.

It is desirable to select an appropriate travel path in a case where, for example, the reliability of an image of a vehicular camera is low or the reliability of map information is low.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The configuration of a vehicle control system 1 that assists with driving of a vehicle will be described below as the embodiment of the disclosure.

The vehicle control system 1 according to the following embodiment allows for driving support control for performing hands-off driving. The vehicle control system 1 has a function of selecting a prediction path in view of ensured safety during hands-off driving if a divergence of a predetermined amount or more occurs between a first prediction path predicted based on map information and a second prediction path predicted based on the external conditions of the subject vehicle.

Figure 1:
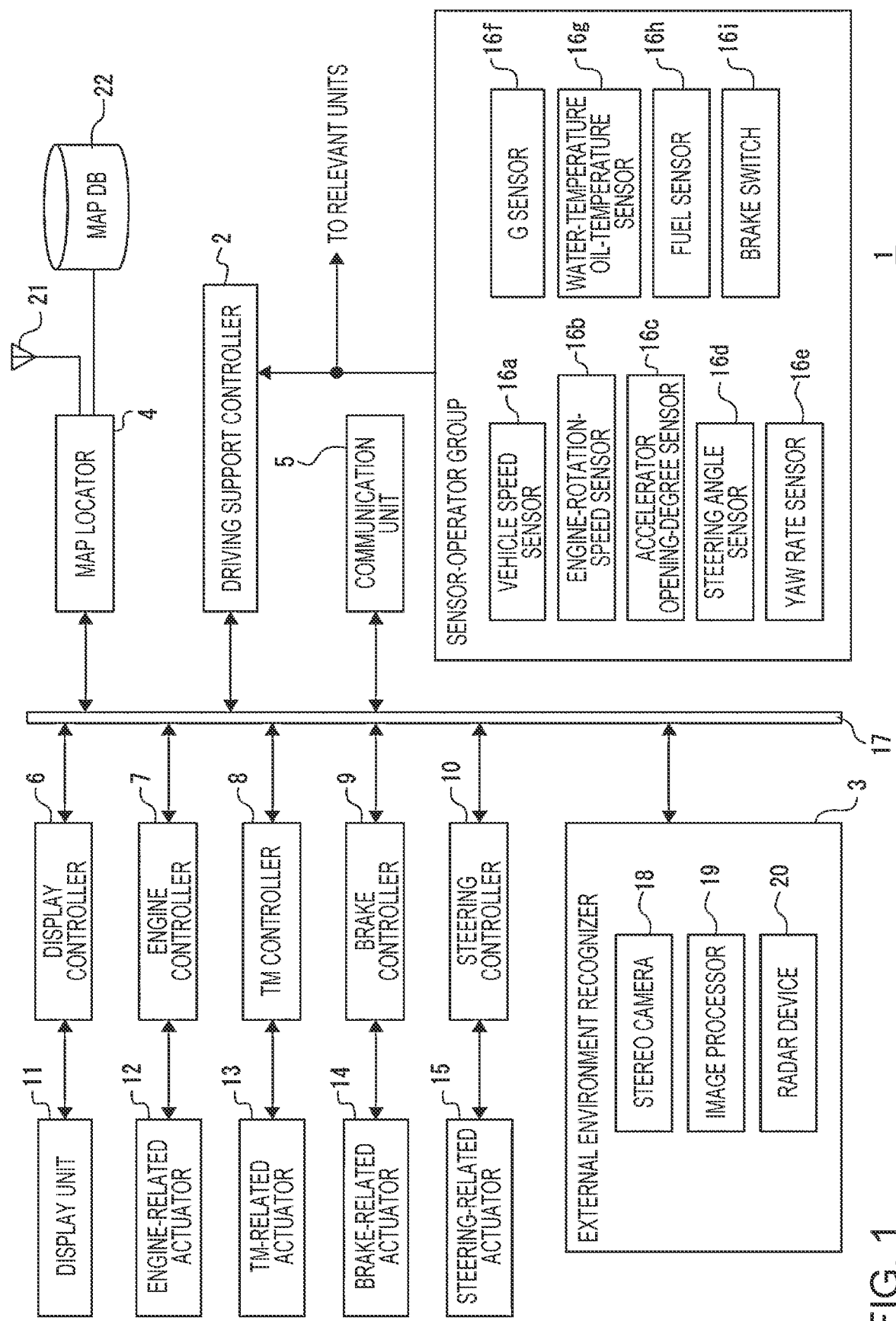
FIG. 1 schematically illustrates a configuration example of a vehicle control system.

FIG. 1 schematically illustrates a configuration example of the vehicle control system 1 equipped in a vehicle 100. Of components included in the vehicle control system 1, FIG. 1 mainly illustrates relevant components related to the embodiment of the disclosure. Therefore, the vehicle control system 1 may include components not illustrated in FIG. 1.

The vehicle control system 1 includes a driving support controller 2, an external environment recognizer 3, a map locator 4, a communication unit 5, a display controller 6, an engine controller 7, a transmission (TM) controller 8, a brake controller 9, a steering controller 10, a display unit 11, an engine-related actuator 12, a TM-related actuator 13, a brake-related actuator 14, a steering-related actuator 15, and a sensor-operator group 16.

The driving support controller 2, the external environment recognizer 3, the map locator 4, the communication unit 5, the display controller 6, the engine controller 7, the TM controller 8, the brake controller 9, and the steering controller 10 are coupled to one another by using a bus 17.

The external environment recognizer 3 has a function of recognizing the external environment of the vehicle 100 and acquiring external environment information, and is constituted of a microcomputer equipped with, for example, a central processing unit (CPU), a read-only memory (ROM), and a random access memory (RAM).

The external environment recognizer 3 includes, for example, a stereo camera 18 capable of capturing an image in front of the vehicle 100, an image processor 19 that performs various kinds of processing on the image acquired from the stereo camera 18, a radar device 20, such as either one of a millimeter wave radar and a laser radar, and other sensing devices.

The stereo camera 18 includes a plurality of imaging units. Each imaging unit includes a camera optical system and an imaging element, such as either one of a charge coupled device (CCD) and a complementary metal oxide semiconductor (CMOS). A subject image is formed on an imaging surface of the imaging element by the camera optical system, so that an electric signal according to the received amount of light is obtained in pixels.

Each imaging unit is disposed such as to be capable of measuring the distance based on so-called stereo imaging. The electric signal obtained by each imaging unit undergoes analog-to-digital (A/D) conversion and predetermined correction processing, and is supplied as a digital image signal (i.e., captured image data) expressing predetermined-grayscale-based brightness values in units of pixels to the image processor 19.

The stereo camera 18 may be replaced with a camera device equipped with a single imaging unit having a distance-measurable imaging element. In addition to the stereo camera 18 that captures an image in front of the vehicle 100, the external environment recognizer 3 may include an imaging unit that captures an image behind the vehicle 100 and an imaging unit that captures images at the lateral sides of the vehicle 100.

The image processor 19 is constituted of a microcomputer equipped with, for example, a CPU, a ROM, and a RAM, and executes predetermined image processing related to vehicle-exterior environment recognition based on, for example, the captured image data obtained by the imaging units of the stereo camera 18. The image processor 19 executes the image processing by using a storage unit, such as a nonvolatile memory, equipped in the external environment recognizer 3.

The image processor 19 executes various kinds of image processing based on each piece of captured image data obtained by stereo imaging so as to recognize forward information, such as three-dimensional-object data and boundary lines (such as a center line and lane boundary lines) in front of the subject vehicle, and can estimate the road and the lane (i.e., subject-vehicle travel lane) on which the subject vehicle is traveling based on the recognized information. Furthermore, the image processor 19 detects a leading vehicle running ahead on the subject-vehicle travel lane based on, for example, the recognized three-dimensional-object data.

In detail, the processing executed by the image processor 19 based on each piece of captured image data obtained by stereo imaging involves, for example, the following process. First, the process involves generating distance information in accordance with the principle of triangulation from a displacement amount (i.e. parallax) of a corresponding location by using a pair of captured images obtained from the stereo camera 18. Then, the process involves performing known grouping on the distance information, and comparing the grouped distance information with three-dimensional road shape data and three-dimensional-object data stored in advance, thereby extracting, for example, lane line data, a guard rail extending along the road, sidewall data, such as a curb, three-dimensional-object data, such as a vehicle, a stop line, a traffic light, a railroad crossing, a pedestrian crossing, and a lane.

Furthermore, depending on the view angle and the disposition of the imaging units, the image processor 19 may sometimes extract a vehicle running parallel to the subject vehicle.

Accordingly, the image processor 19 can recognize a surrounding object based on the captured images of the imaging units, and can also recognize the behavior of the surrounding object. For example, the image processor 19 can also recognize the speed, the acceleration (i.e., a positive or negative acceleration rate according to acceleration or deceleration), a change in the traveling direction, and an on/off mode of a turn signal of the parallel-running vehicle.

For example, the image processor 19 calculates various kinds of surrounding environment information mentioned above for each frame of the captured image data, and causes the storage unit to successively store (retain) the calculated information.

The map locator 4 includes, for example, a global navigation satellite system (GNSS) receiver 21 and a map database (DB) 22 in which high-resolution map data is stored, and is capable of identifying a high-precision current location of the vehicle 100 serving as the subject vehicle. In detail, in addition to being capable of identifying the road on which the vehicle 100 is traveling, the map locator 4 is also capable of identifying the travel lane.

The driving support controller 2 is constituted of a microcomputer equipped with, for example, a CPU, a ROM, and a RAM, and executes various kinds of driving support control based on detection information and operation input information obtained from, for example, the external environment recognizer 3, the map locator 4, and various types of sensors included in the sensor-operator group 16, or based on information obtained from the communication unit 5.

The driving support controller 2 is coupled to controllers similarly constituted of microcomputers by using the bus 17. Such controllers include the display controller 6, the engine controller 7, the TM controller 8, the brake controller 9, and the steering controller 10. The driving support controller 2 is capable of performing data communication with these controllers. The driving support controller 2 gives a command to any controller to be used among these controllers and causes the controller to execute driving-support-related operation (i.e., driving support control).

Assumed examples of the driving support control to be executed by the driving support controller 2 include auto lane keep control, autonomous emergency braking (AEB), adaptive cruise control (ACC), and autonomous lane change control.

The driving support controller 2 performs control for switching among a hands-on driving mode, a hands-off driving mode, a hands-on request mode, and a minimum risk maneuver (MRM) execution mode as control modes of the vehicle 100.

The hands-on driving mode is provided with a normal driving mode in which the driver steers the vehicle 100 and in which, for example, auto lane keep control is not executed, and a lane keep control mode (i.e., lane keeping system (LKS)) that involves performing control for continuously keeping the lane during a hands-on state. In the normal driving mode, some of the driving support control, such as autonomous emergency braking, may be executable.

The hands-off driving mode involves performing vehicle control for continuously keeping the vehicle 100 traveling on an appropriate travel lane while the driver keeps his/her hands away from the steering wheel. For example, a transition to the hands-off driving mode is possible during a congested state where the vehicle speed falls below a predetermined value. Accordingly, driving support control for continuously keeping the travel lane by using information about a leading vehicle running ahead and information about the vehicle-exterior environment is executable.

The hands-on request mode is a mode to be transitioned to when a predetermined condition is satisfied in the hands-off driving mode, and involves requesting the driver to operate the steering wheel. The hands-on request mode may also be regarded as a transition period from the hands-off driving mode to the hands-on driving mode.

The MRM execution mode is a mode to be transitioned to when, for example, the driver determines that it is difficult to continue driving due to an abnormality. The MRM execution mode involves performing control for gradually decelerating and stopping the vehicle 100.

The transition condition for each control mode will be described later.

The communication unit 5 is capable of performing network communication, so-called V2V (vehicle-to-vehicle) communication, and road-to-vehicle communication. The driving support controller 2 can acquire various kinds of information received by the communication unit 5. The communication unit 5 can also acquire various kinds of information, such as information about the environment surrounding the current location and road information, in accordance with network communication using, for example, the Internet.

The sensor-operator group 16 comprehensively indicates various types of sensors and operators provided in the vehicle 100. Examples of the sensors included in the sensor-operator group 16 include a vehicle speed sensor 16a that detects the speed of the subject vehicle, an engine-rotation-speed sensor 16b that detects the rotation speed of the engine, an accelerator opening-degree sensor 16c that detects the degree of opening of the accelerator pedal from the amount by which the accelerator pedal is pressed down, a steering angle sensor 16d that detects the steering angle, a yaw rate sensor 16e that detects the yaw rate, a G sensor 16f that detects the acceleration, a water-temperature oil-temperature sensor 16g that measures the coolant temperature and the oil temperature serving as indicators for estimating the engine temperature, a fuel sensor 16h that measures the vertical position of a float provided in the fuel tank to detect the fuel level, and a brake switch 16i that is turned on or off in accordance with whether the brake pedal is operated or not operated.

The display controller 6 controls the display operation of the display unit 11 based on a detection signal from a predetermined sensor in the sensor-operator group 16 or operation input information from an operator in the sensor-operator group 16. For example, based on a command from the driving support controller 2, the display unit 11 can display a predetermined attention message as a part of driving support. In detail, in the aforementioned hands-on request mode, the display unit 11 is caused to display a message prompting the driver to input a steering operation.

Examples of the display unit 11 used include a multi-function display (MFD), a center information display (CID), and a human machine interface (HMI), such as a head-up display (HUD).

If an attention message is to be displayed, a sound, such as a warning sound, may be simultaneously presented.

The engine controller 7 controls each type of actuator provided as the engine-related actuator 12 based on a detection signal from a predetermined sensor in the sensor-operator group 16 or operation input information from an operator in the sensor-operator group 16.

Examples of the engine-related actuator 12 provided include various types of actuators related to the driving of the engine, such as a throttle actuator that drives a throttle valve and an injector that performs fuel injection.

For example, the engine controller 7 performs control for starting and stopping the engine in accordance with an operation performed on an ignition switch. Furthermore, for example, the engine controller 7 also controls the fuel injection timing, the fuel injection pulse width, and the degree of opening of the throttle valve based on detection signals from predetermined sensors, such as the engine-rotation-speed sensor 16b and the accelerator opening-degree sensor 16c.

Moreover, the engine controller 7 determines a target degree of opening of the throttle valve from, for example, a map based on a requested torque, calculated and output by the driving support controller 2 based on target acceleration, and the transmission gear ratio of the automatic transmission, and controls the throttle actuator (i.e., controls the output of the engine) based on the determined degree of opening of the throttle valve.

The TM controller 8 controls each type of actuator provided as the TM-related actuator 13 based on a detection signal from a predetermined sensor in the sensor-operator group 16 or operation input information from an operator in the sensor-operator group 16.

The TM-related actuator 13 provided is, for example, an actuator for performing gear-change control of the automatic transmission.

For example, when an automatic transmission mode is selected by using the select lever, the TM controller 8 performs gear-change control by outputting a gear-change signal in accordance with a predetermined gear-change pattern. When a manual transmission mode is set, the TM controller 8 performs gear-change control by outputting a gear-change signal according to a shift up/down command given using the select lever to the aforementioned actuator.

If the automatic transmission is a continuously variable transmission (CVT), the aforementioned gear-change control when the automatic transmission mode is set involves performing control for continuously changing the transmission gear ratio.

The brake controller 9 controls each type of actuator provided as the brake-related actuator 14 based on a detection signal from a predetermined sensor in the sensor-operator group 16 or operation input information from an operator in the sensor-operator group 16.

Examples of the brake-related actuator 14 provided include various types of actuators related to braking, such as a hydraulic-pressure control actuator for controlling the hydraulic pressure output from a brake booster to a master cylinder and the hydraulic pressure within a brake fluid pipe.

For example, the brake controller 9 applies a braking force to the subject vehicle by controlling the aforementioned hydraulic-pressure control actuator based on hydraulic-pressure command information output from the driving support controller 2. Moreover, the brake controller 9 calculates a wheel slip ratio from detection information of predetermined sensors (e.g. an axle rotation speed sensor and the vehicle speed sensor 16a) and causes the aforementioned hydraulic-pressure control actuator to increase or decrease the hydraulic pressure in accordance with the slip ratio, thereby realizing so-called antilock brake system (ABS) control.

The steering controller 10 determines a desired steering torque in accordance with a target steering angle provided from the driving support controller 2 and controls the steering-related actuator 15, thereby realizing desired automatic steering.

Additionally, the sensor-operator group 16 includes an intake airflow sensor that detects the airflow taken into the engine, a throttle opening-degree sensor disposed in an intake air passage and detecting the degree of opening of the throttle valve that adjusts the intake airflow to be supplied to each cylinder of the engine, an outside air temperature sensor that detects the air temperature outside the vehicle, various types of temperature sensors that detect the wheel temperature and the brake temperature, and a gradient sensor that detects the gradient of the road on which the subject vehicle is traveling.

Examples of the operators include an ignition switch for inputting an engine start/stop command, an operator for switching between driving modes as the aforementioned driving-support-control-related operation, a select lever for selecting between the automatic transmission mode and the manual transmission mode in the automatic transmission and for inputting a shift up/down command during the manual transmission mode, and a display change switch for changing the display information on the MFD, to be described later, provided as the display unit 11.

The display unit 11 comprehensively indicates various types of meters, such as a speed meter and a tachometer provided within a meter panel disposed in front of the driver, the MFD, and a display device for presenting other information to the driver. The MFD is capable of displaying various kinds of information, such as the total travel distance of the subject vehicle, the outside air temperature, and the instantaneous fuel consumption, simultaneously or in a switching manner.

Figure 2:
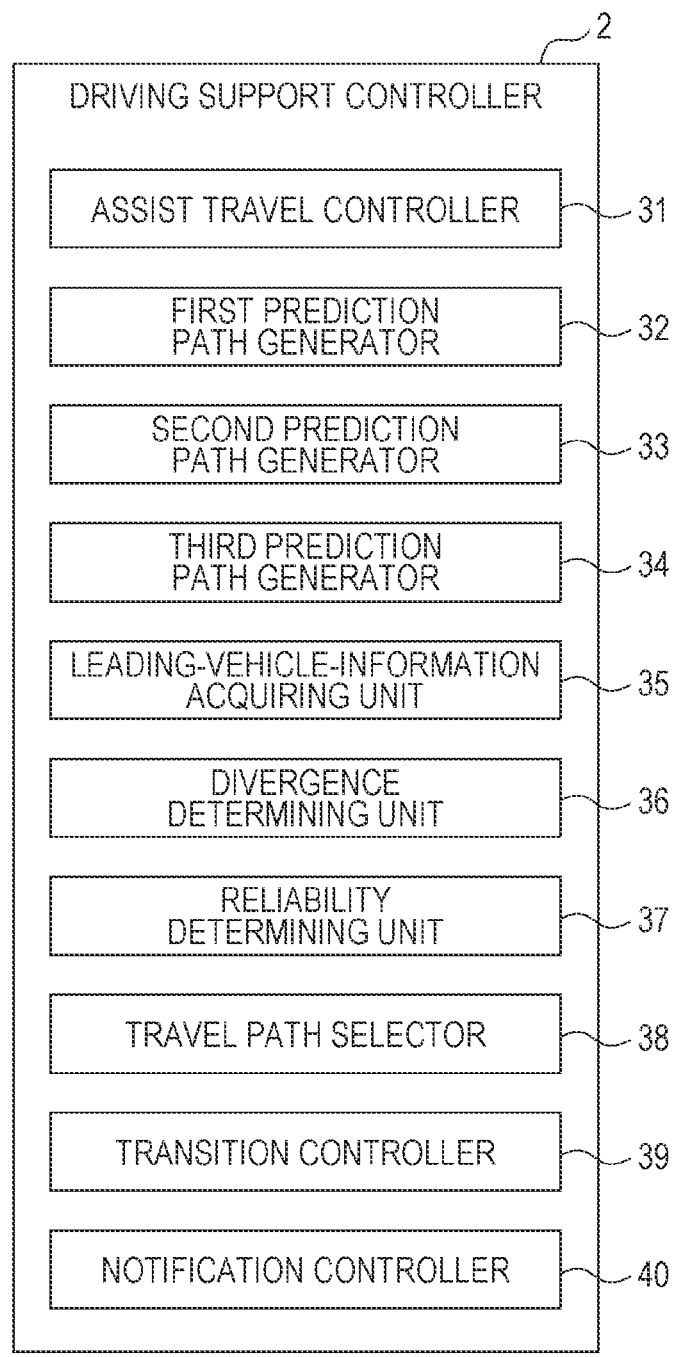
FIG. 2 illustrates a functional configuration of a driving support controller.

FIG. 2 illustrates a functional configuration provided by software used by the driving support controller 2 for performing processes in this embodiment. The functions may partially or entirely be realized by hardware.

The driving support controller 2 includes an assist travel controller 31, a first prediction path generator 32, a second prediction path generator 33, a third prediction path generator 34, a leading-vehicle-information acquiring unit 35, a divergence determining unit 36, a reliability determining unit 37, a travel path selector 38, a transition controller 39, and a notification controller 40.

In the following description, the vehicle 100 serving as the subject vehicle will be referred to as "subject vehicle 100A", and the vehicle 100 serving as a leading vehicle running ahead will be referred to as "leading vehicle 100B".

The assist travel controller 31 is capable of executing driving support control that includes auto lane keep control, autonomous emergency braking, and adaptive cruise control. In this embodiment, the assist travel controller 31 is capable of executing auto lane keep control during a hands-off state (i.e., hands-off driving) in addition to auto lane keep control during a hands-on state. Hands-off driving involves executing control for continuously keeping the lane in a state where the leading vehicle 100B is detected in front of the subject vehicle 100A during, for example, a traffic jam. In the hands-off driving, auto lane keep control is performed by using a prediction path generated by using vehicle-exterior-environment recognition result information, such as information acquired from the stereo camera 18, and a prediction path generated by using information acquired from the map locator 4. If a divergence occurs between these prediction paths, for example, a process for selecting a travel path based on the reliability of each prediction path and a process for making a hands-on request are executed. This will be described in detail later.

The first prediction path generator 32 generates a prediction path of the subject vehicle 100A based on positional information of the subject vehicle 100A and map information acquired from the map locator 4. The prediction path generated by the first prediction path generator 32 will be referred to as "first prediction path PT1".

The second prediction path generator 33 generates a prediction path of the subject vehicle 100A based on vehicle-exterior environment information acquired from the stereo camera 18 and other sensors. In detail, the prediction path is generated based on a lane line (i.e., boundary line) recognized by the stereo camera 18. The prediction path generated by the second prediction path generator 33 will be referred to as "second prediction path PT2".

Figure 3:
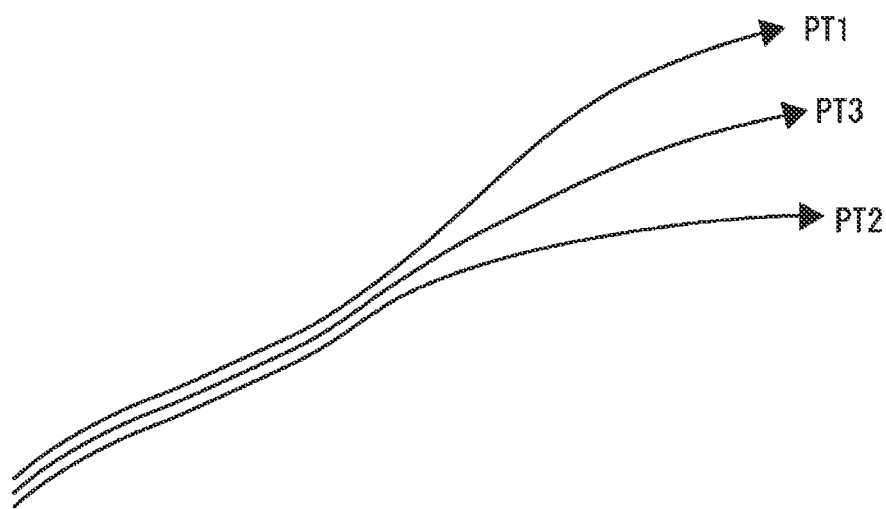
FIG. 3 illustrates a third prediction path generated from a first prediction path and a second prediction path.

The third prediction path generator 34 generates a third prediction path PT3 from the first prediction path PT1 and the second prediction path PT2. For example, as illustrated in FIG. 3, the third prediction path generator 34 generates a path extending through an intermediate point between the first prediction path PT1 and the second prediction path PT2 as the third prediction path PT3.

The leading-vehicle-information acquiring unit 35 acquires information related to the travel path of the leading vehicle 100B based on leading vehicle information and lane line information acquired as a result of image processing in the image processor 19.

In detail, for example, the information is related to the traveling direction and the travel lane of the leading vehicle 100B.

The divergence determining unit 36 determines whether a divergence of a predetermined amount or more has occurred between the first prediction path PT1 and the second prediction path PT2. For example, the divergence determination is performed based on the left and right lane lines recognized on the first prediction path PT1 and the left and right edge positions of the subject vehicle 100A if the subject vehicle 100A is to travel on the second prediction path PT2.

The divergence determination process will be described below in detail with reference to FIG. 4 and FIG. 5.

The movement trajectories of a left edge 100EL and a right edge 100ER of the subject vehicle 100A if the subject vehicle 100A is to travel on the first prediction path PT1 generated based on the information from the map locator 4 will be referred to as "left trajectory TL" and "right trajectory TR", respectively.

Furthermore, a left lane line of the subject vehicle 100A recognized by the image processor 19 will be referred to as "left lane line WLL", and a right lane line of the subject vehicle 100A will be referred to as "right lane line WLR".

Figure 4:
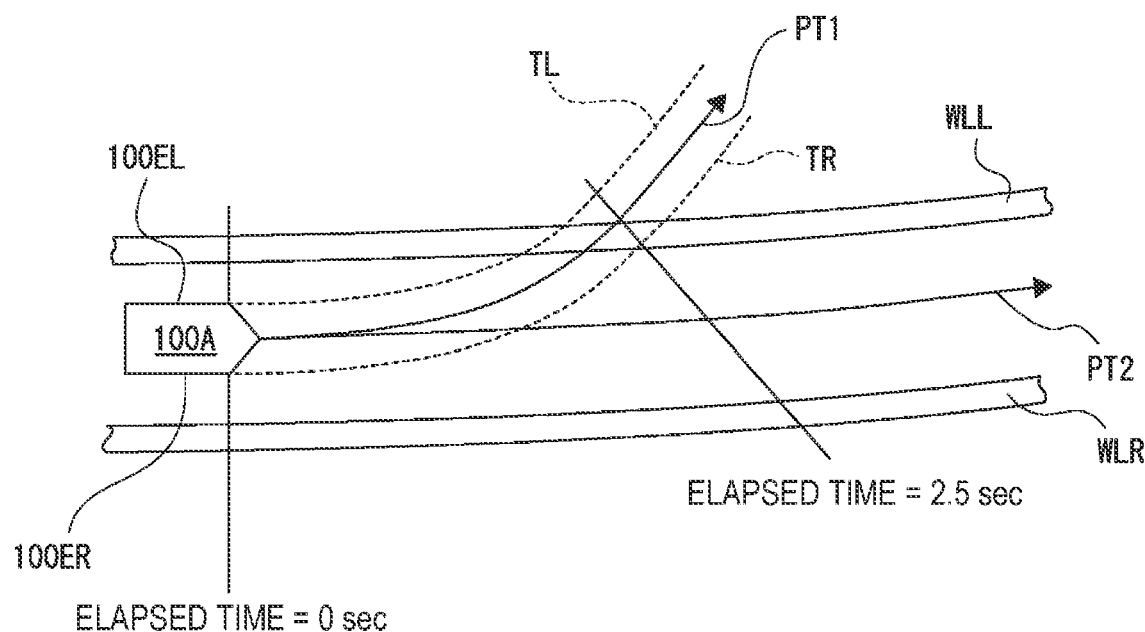
FIG. 4 schematically illustrates a state where it is determined in a divergence determination process that there is a divergence.

If either one of the left edge 100EL and the right edge 100ER of the subject vehicle 100A on the first prediction path PT1 deviates from the corresponding lane line by a predetermined amount or more 2.5 seconds after the current time point, it is determined that there is a divergence between the first prediction path PT1 and the second prediction path PT2 (see FIG. 4).

In other words, it is determined that there is a divergence between the two prediction paths if the subject vehicle 100A traveling along either one of the prediction paths deviates from the other prediction path by a predetermined amount or more. This determination result can be regarded as a result obtained in a case where the divergence is to increase after a predetermined time period (e.g., after 2.5 seconds) even if there is no divergence between the first prediction path PT1 and the second prediction path PT2 at the current location of the subject vehicle 100A.

Figure 5:
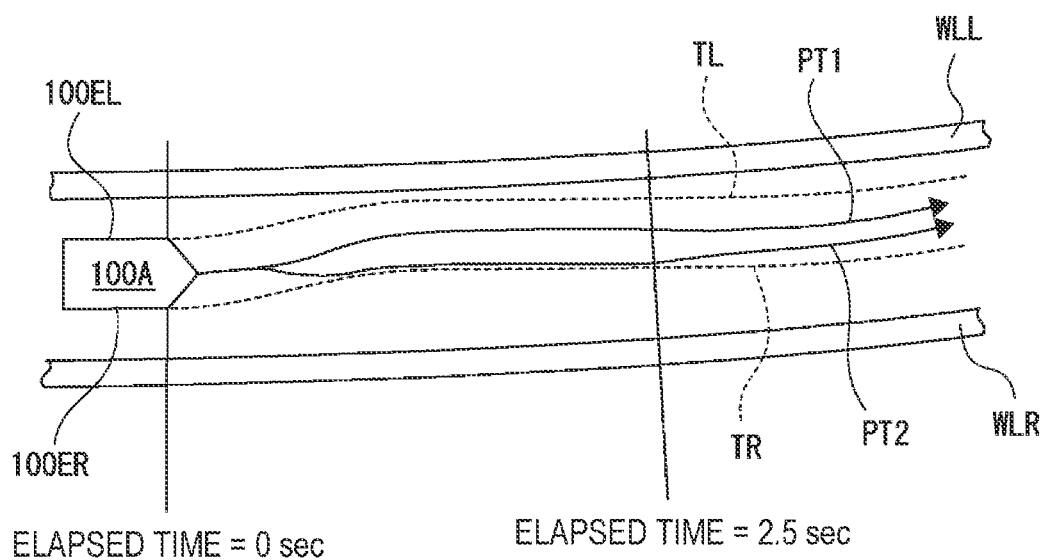
FIG. 5 schematically illustrates a state where it is determined in the divergence determination process that there is no divergence.

On the other hand, even when there is a divergence to some extent between the two prediction paths, it is determined that there is no divergence if the amount of divergence is within a predetermined amount (see FIG. 5).

A state where it is determined that there is a divergence is a state where there is a possibility that the subject vehicle 100A may eventually travel on an inappropriate travel path if the subject vehicle 100A continues to travel along either one of the prediction paths.

A state where it is determined that there is no divergence is a state where an appropriate travel path can be maintained even if the subject vehicle 100A continues to travel along either one of the prediction paths.

The reliability determining unit 37 determines the prediction path with the higher reliability between the first prediction path PT1 and the second prediction path PT2.

The reliability determination process may involve calculating the reliability of each of the first prediction path PT1 and the second prediction path PT2 in a plurality of levels (e.g., 0 to 100), or calculating the levels of reliability in the form of flags (0 and 1).

Such reliability information is to be used when the divergence between the first prediction path PT1 and the second prediction path PT2 is large.

The travel path selector 38 performs a process for selecting a prediction path from the first prediction path PT1, the second prediction path PT2, and the third prediction path PT3.

The transition controller 39 performs transition control among the hands-on driving mode (i.e., the normal driving mode and the lane keep control mode), the hands-off driving mode, the hands-on request mode, and the MRM execution mode. For example, if it is determined that there is a divergence of a predetermined amount or more between the first prediction path PT1 and the second prediction path PT2 during the hands-off driving mode, for example, a process for transitioning to the hands-on request mode is performed. Specific mode transition conditions will be described later.

Figure 6:
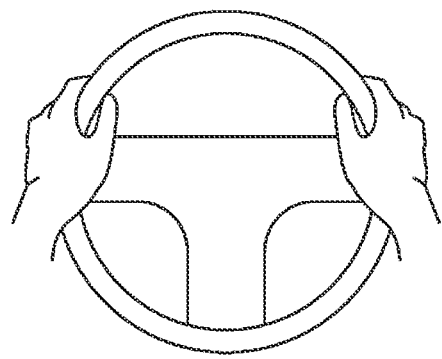
FIG. 6 illustrates an example of a notification screen presented to a driver during a hands-on request mode.
Figure 7:
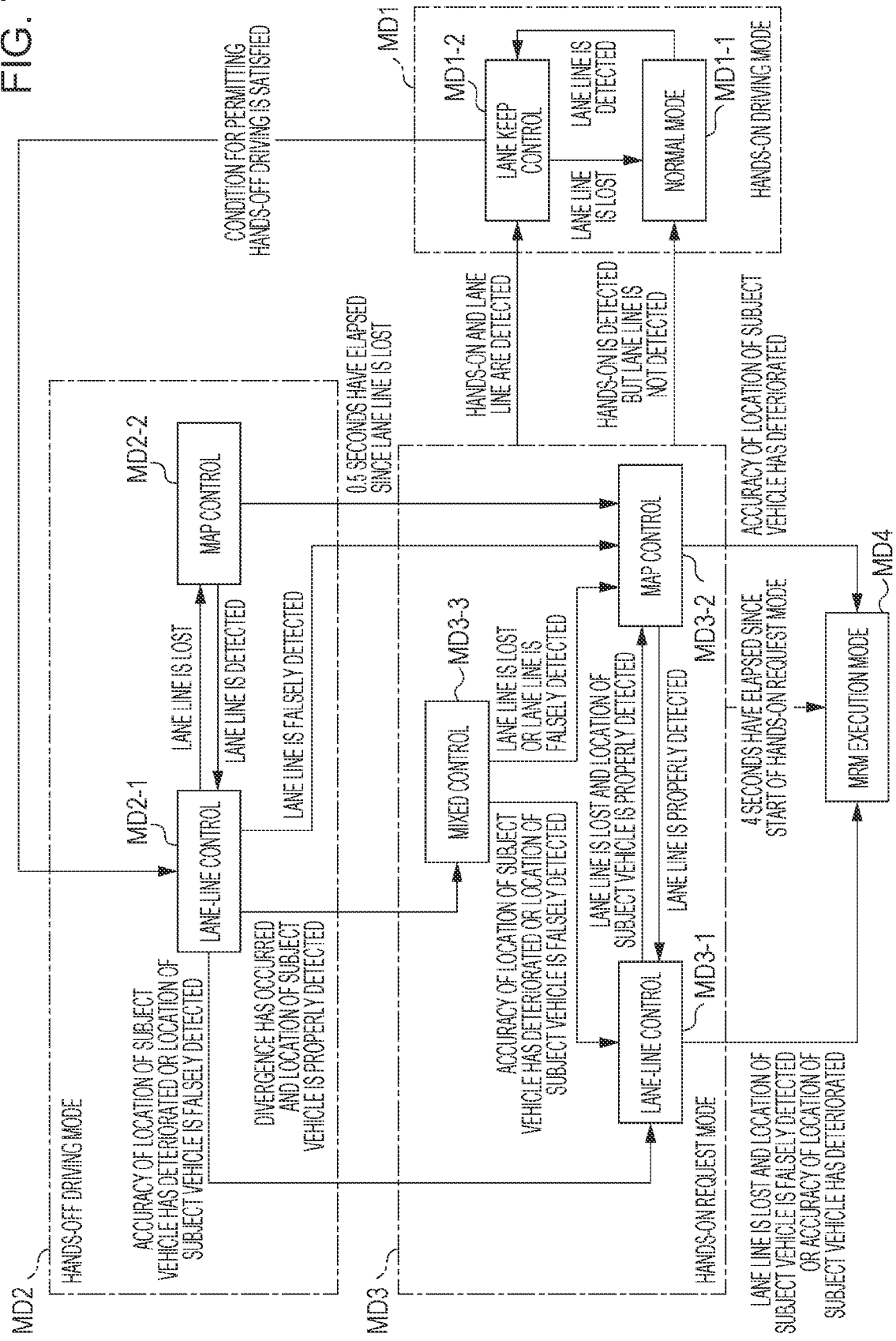
FIG. 7 illustrates mode transitions and transition conditions.

The notification controller 40 is capable of executing various kinds of notification processes for the driver. In this embodiment, a notification process for prompting the driver to input a steering operation is performed during the hands-on request mode. In detail, the notification process involves displaying a notification image illustrated in FIG. 6 on the aforementioned display unit 11, such as the MFD, and outputting a sound-based alert, such as a warning sound.

First, each mode will be described.

As mentioned above, the hands-on driving mode, the hands-off driving mode, the hands-on request mode, and the MRM execution mode are modes controlled by the transition controller 39, and will be referred to as "hands-on driving mode MD1", "hands-off driving mode MD2", "hands-on request mode MD3", and "MRM execution mode MD4", respectively.

The hands-on driving mode MD1, the hands-off driving mode MD2, and the hands-on request mode MD3 each have several modes.

As mentioned above, the hands-on driving mode MD1 is further provided with a normal driving mode MD1-1 in which the driver performs the steering operation and a lane keep control mode MD1-2 in which lane keeping is performed in a hands-on state.

The hands-off driving mode MD2 is further provided with a lane-line control mode MD2-1 in which the subject vehicle 100A travels along a lane line recognized by, for example, the stereo camera 18, that is, based on the second prediction path PT2, and a map control mode MD2-2 in which the subject vehicle 100A travels based on information from the map locator 4, that is, based on the first prediction path PT1.

The hands-on request mode MD3 is provided with a lane-line control mode MD3-1 in which the subject vehicle 100A travels based on the second prediction path PT2, a map control mode MD3-2 in which the subject vehicle 100A travels based on the first prediction path PT1, and a mixed control mode MD3-3 in which the subject vehicle 100A travels based on the third prediction path PT3.

First, if there is no problem with either of the first prediction path PT1 and the second prediction path PT2 during the hands-off driving mode MD2, that is, if the reliability of the first prediction path PT1 and the reliability of the second prediction path PT2 are both high, the hands-off driving mode MD2 is controlled to the lane-line control mode MD2-1, so that the travel path of the subject vehicle 100A is set based on the second prediction path PT2 as control based on the lane line information.

In this state, if the lane line is lost, that is, if the lane line is not detectable in the image output from the stereo camera 18, a transition is made to the map control mode MD2-2, so that the travel path of the subject vehicle 100A is set based on the first prediction path PT1 as control based on the map information.

When the state where the lane line is lost is resolved in the map control mode MD2-2, that is, when the lane line is detected again, a transition is made from the map control mode MD2-2 to the lane-line control mode MD2-1, whereby the subject vehicle 100A is controlled based on the second prediction path PT2.

If a divergence between the first prediction path PT1 and the second prediction path PT2 occurs in a state where the location of the subject vehicle 100A is properly detected (i.e., a state where there is no false detection of the location of the subject vehicle 100A and the accuracy of the location of the subject vehicle 100A has not deteriorated) during the lane-line control mode MD2-1, that is, if the state changes from a no-divergence state to a divergence state, a transition is made to the mixed control mode MD3-3, whereby the travel path of the subject vehicle 100A is set based on the third prediction path PT3.

If the accuracy of the location of the subject vehicle 100A deteriorates or the location of the subject vehicle 100A is falsely detected during the mixed control mode MD3-3, that is, if the reliability of the map locator 4 has decreased, a transition is made to the lane-line control mode MD3-1, whereby the subject vehicle 100A is controlled based on the second prediction path PT2.

Furthermore, if the lane line is lost or the lane line is falsely detected during the mixed control mode MD3-3, a transition is made to the map control mode MD3-2, whereby the subject vehicle 100A is controlled based on the first prediction path PT1.

During the hands-on request mode MD3 including the mixed control mode MD3-3, if a hands-on state is detected, such as when the driver operates the steering wheel or touches the steering wheel, a transition is made to another mode.

In detail, if a hands-on state is detected while the lane line is also detected, a transition is made to the lane keep control mode MD1-2 of the hands-on driving mode MD1. Accordingly, auto lane keep control based on the detected lane line is executed.

On the other hand, if a hands-on state is detected but the lane line is lost, a transition is made to the normal driving mode MD1-1 of the hands-on driving mode MD1.

If the lane line detected in the lane keep control mode MD1-2 is lost, a transition is made to the normal driving mode MD1-1.

In contrast, if the lane line is detected in the normal driving mode MD1-1, a transition can be made to the lane keep control mode MD1-2.

If a condition for permitting hands-off driving in the lane keep control mode MD1-2 is satisfied, a transition is made to the lane-line control mode MD2-1 of the hands-off driving mode MD2.

The condition for permitting hands-off driving may conceivably include various kinds. One example is a condition where the location of the subject vehicle 100A is properly detected while the lane line is continuously detected, and the vehicle speed is below a predetermined speed. Furthermore, it may be determined that the condition is satisfied when the subject vehicle 100A is traveling on a specific road, such as a highway, or when the user permits hands-off driving.

If the accuracy of the location of the subject vehicle 100A deteriorates or the location of the subject vehicle 100A is falsely detected during the lane-line control mode MD2-1 of the hands-off driving mode MD2, a transition is made to the lane-line control mode MD3-1 of the hands-on request mode MD3, whereby the subject vehicle 100A is controlled based on the second prediction path PT2 while the driver is requested to perform hands-on driving.

If the lane line is falsely detected during the lane-line control mode MD2-1 of the hands-off driving mode MD2, a transition is made to the map control mode MD3-2 of the hands-on request mode MD3, whereby the subject vehicle 100A is controlled based on the first prediction path PT1 while the driver is requested to perform hands-on driving.

Although the map control mode MD2-2 of the hands-off driving mode MD2 is a state where the lane line is lost, if the lost state continues for 0.5 seconds or longer, a transition is made to the map control mode MD3-2 of the hands-on request mode MD3, whereby the subject vehicle 100A is continuously controlled based on the first prediction path PT1 while the driver is requested to perform hands-on driving.

That is, the map control mode MD2-2 of the hands-off driving mode MD2 is a mode to be temporarily transitioned to when the lane line is lost. If the state where the lane line is lost continues for a predetermined time or longer, the driver is requested to perform hands-on driving.

Although the lane-line control mode MD3-1 of the hands-on request mode MD3 is a mode to be transitioned to in a state where the lane line is properly detected, if the lane line becomes lost during the lane-line control mode MD3-1, a transition is made to another mode. For example, if the lane line is lost in a state where the location of the subject vehicle 100A is properly detected, a transition is made to the map control mode MD3-2. In contrast, if the lane line is lost in a state where the location of the subject vehicle 100A is not properly detected, a transition is made to the MRM execution mode MD4.

Although the map control mode MD3-2 of the hands-on request mode MD3 is a state where the lane line is lost, if the lane line is properly detected again, that is, if the lane line is detected and is not falsely detected, a transition is made to the lane-line control mode MD3-1.

On the other hand, if the accuracy of the location of the subject vehicle 100A deteriorates during the map control mode MD3-2, that is, if the lane line and the location of the subject vehicle 100A are both not properly detected, a transition is made to the MRM execution mode MD4.

The MRM execution mode MD4 is, for example, a mode to be transitioned to in a state of emergency, such as when the driver loses consciousness.

In addition to the aforementioned example, an example where a transition is made to the MRM execution mode MD4 is a case where a hands-on state is not detectable for a predetermined period (e.g., 4 seconds) during each mode of the hands-on request mode MD3. In this case, it is determined that the driver is in a state where the driver is not able to drive the subject vehicle 100A, and a transition is made to the MRM execution mode MD4.

An example of various kinds of processes executed by the driving support controller 2 will now be described with reference to the appended drawings.

Figure 8:
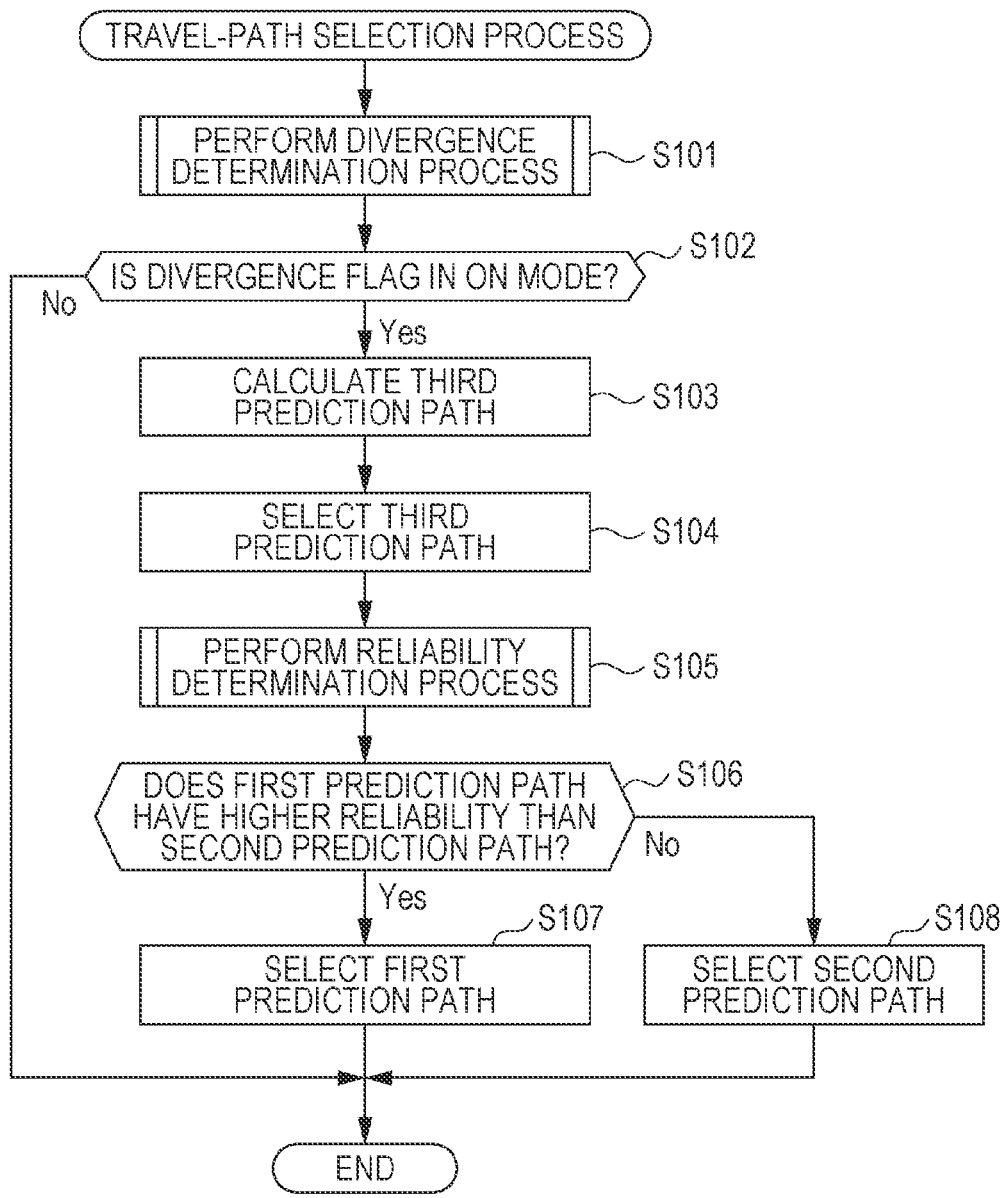
FIG. 8 is a flowchart illustrating an example of a travel-path selection process.

A travel-path selection process illustrated in FIG. 8 involves selecting an appropriate travel path for the subject vehicle 100A by using various kinds of information. When the series of processes illustrated in FIG. 8 is to be started, the transition controller 39 has selected the hands-off driving mode MD2. Then, a mode transition process is executed in accordance with each processing result. In flowcharts illustrated in the drawings, a process related to a mode transition is omitted.

In step S101, the driving support controller 2 performs a divergence determination process. As mentioned above, the divergence determination process involves determining whether a predetermined divergence has occurred between the first prediction path PT1 and the second prediction path PT2. For example, when a travel path of the subject vehicle 100A is set in accordance with the first prediction path PT1, it is determined whether either one of the left edge 100EL and the right edge 100ER of the subject vehicle 100A is to deviate to outward of a currently traveling lane of the subject vehicle 100A by a predetermined amount from a lane line position identified from an image. That is, it is determined whether either one of the left edge 100EL and the right edge 100ER of the subject vehicle 100A has passed over a lane line of the currently traveling lane. The details of the process will be described later with reference to another flowchart. Whereas, in a same traveling situation as the traveling situation where the travel path of the subject vehicle 100A is set in accordance with the first prediction path PT1, a travel path of the subject vehicle 100A set in accordance with the second prediction path PT2 may be within the currently traveling lane.

In the divergence determination process, a divergence flag is output. The divergence flag is set to the ON mode when it is determined that there is a divergence, and is set to the OFF mode when it is determined that there is no divergence.

A situation where it may be determined that there is a divergence in the divergence determination process will now be described with reference to FIG. 9 and FIG. 10.

Figure 9:
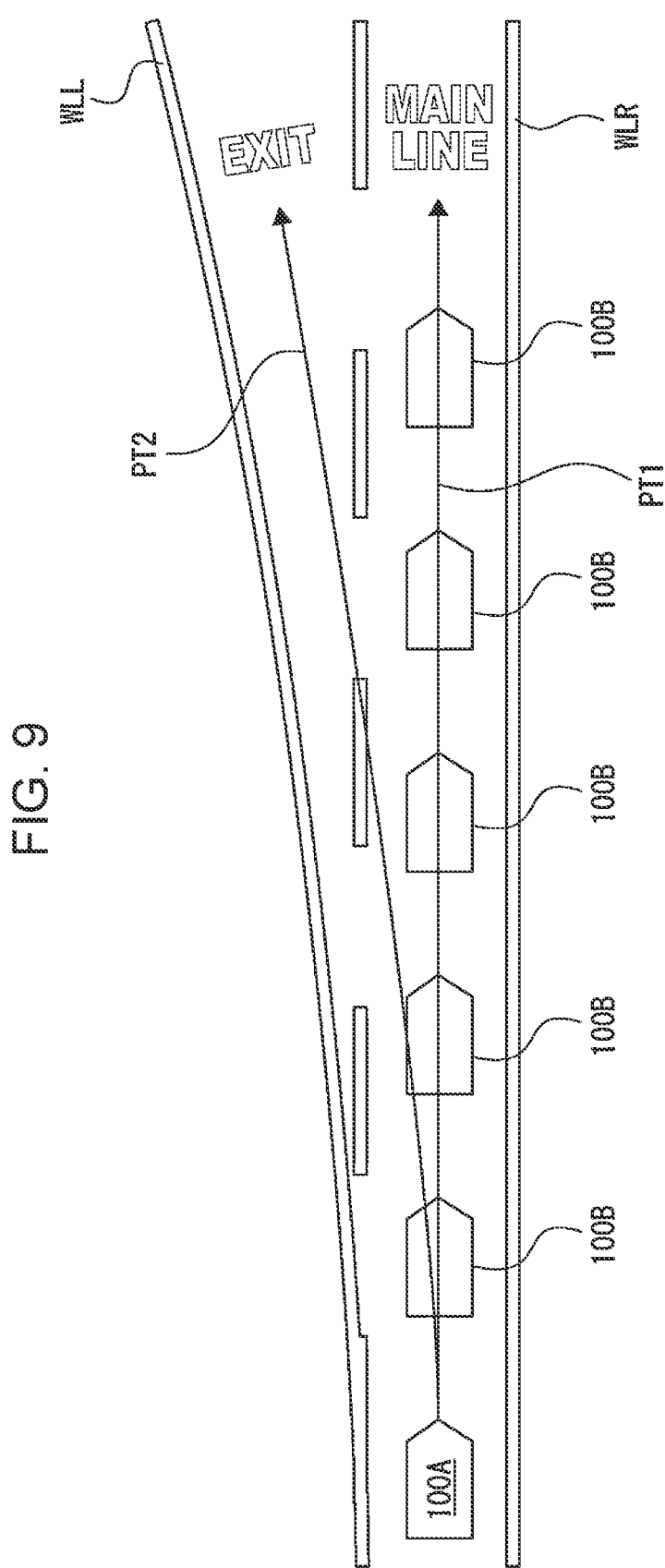
FIG. 9 illustrates an example of a situation where it may be determined in the divergence determination process that there is a divergence.

FIG. 9 illustrates a first example where it may be determined that there is a divergence in the divergence determination process. FIG. 9 schematically illustrates an area surrounding an exit of a highway. As illustrated in FIG. 9, if the driving support controller 2 selects the first prediction path PT1 based on information from the map locator 4 as the travel path, the subject vehicle 100A continues to travel on the main line of the highway. In contrast, if the travel path of the subject vehicle 100A is selected based on the left lane line WLL serving as a lane line to the left of the subject vehicle 100A, the second prediction path PT2 is selected. In this case, it is determined that there is a divergence of a predetermined amount or more between the first prediction path PT1 and the second prediction path PT2.

If the dashed lane line illustrated in FIG. 9 is properly recognized by, for example, the stereo camera 18, the second prediction path PT2 can be appropriately set when the subject vehicle 100A is traveling on the main line of the highway. That is, it is possible to generate the second prediction path PT2 as a travel path when the subject vehicle 100A is traveling on the main line. However, if either one of the dashed lane line and the right lane line WLR is not recognizable due to, for example, the presence of the leading vehicle 100B, the second prediction path PT2 is generated based on the left lane line WLL, sometimes resulting in a divergence between the first prediction path PT1 and the second prediction path PT2.

Figure 10:
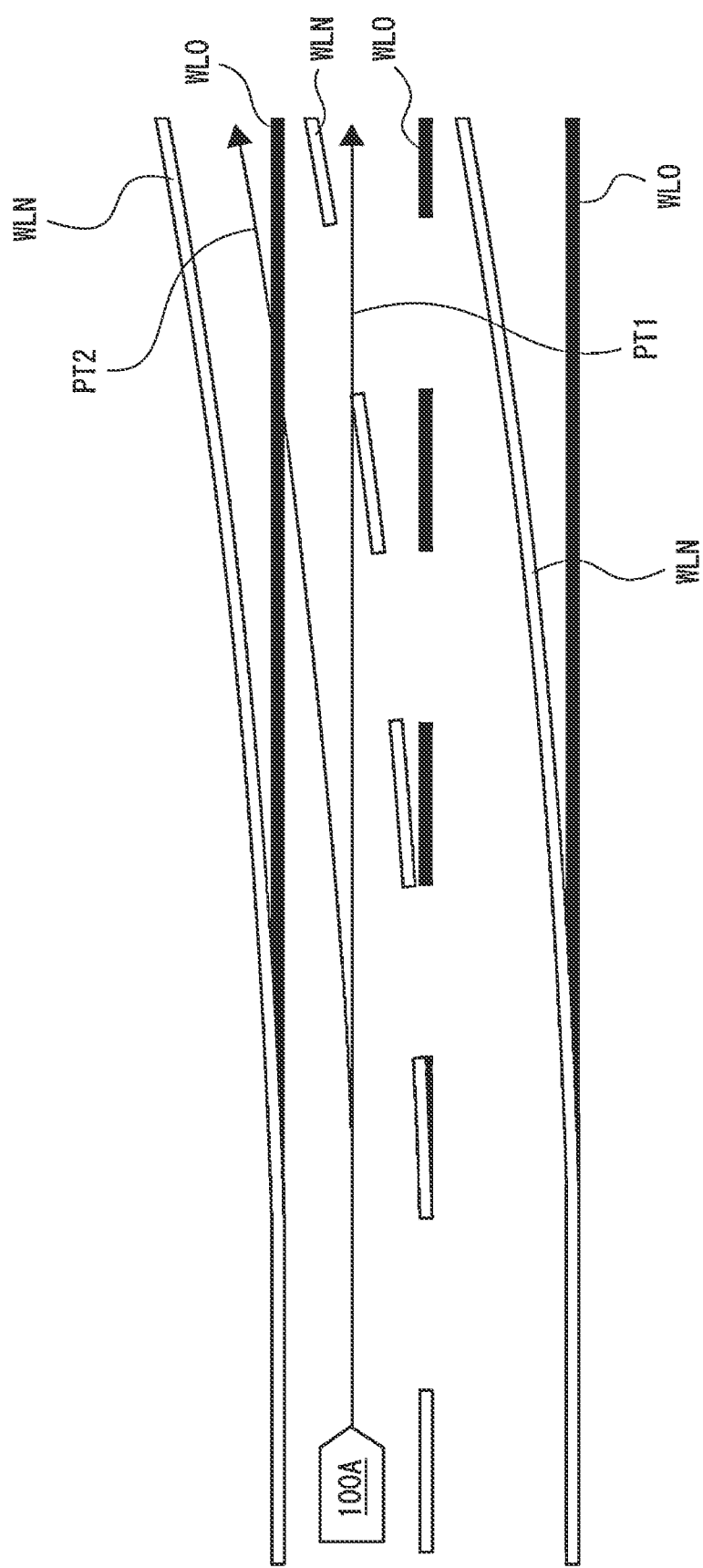
FIG. 10 illustrates another example of a situation where it may be determined in the divergence determination process that there is a divergence.

FIG. 10 illustrates a second example where it may be determined that there is a divergence in the divergence determination process. FIG. 10 schematically illustrates an area where the road layout has been changed. In FIG. 10, lane lines indicated as black lines denote old lane lines WLO for identifying a travel lane before the change, whereas lane lines indicated as white lines denote new lane lines WLN for identifying a travel lane after the change.

The following relates to a conceivable case where the information of the map locator 4 is old. As illustrated in FIG. 10, if the driving support controller 2 is to perform vehicle control based on the old information from the map locator 4, the first prediction path PT1 extending along the old travel lane identified from the old lane lines WLO is selected as the travel path. In contrast, if the travel path of the subject vehicle 100A is selected based on the new lane lines WLN recognized by the stereo camera 18, the second prediction path PT2 is selected. In this case, it is determined that there is a divergence of a predetermined amount or more between the first prediction path PT1 and the second prediction path PT2.

Referring back to the flowchart in FIG. 8, the driving support controller 2 performs a branching process in step S102 in accordance with whether the divergence flag is in the ON mode.

If the divergence flag is in the OFF mode, it is not necessary to reselect the travel path, thus the travel-path selection process illustrated in FIG. 8 is ended. In this case, the control in the hands-off driving mode MD2 is continuously performed based on the image from the stereo camera 18 while, for example, the location of the subject vehicle 100A is acquired from the map locator 4.

In contrast, if the divergence flag is in the ON mode, it may be necessary to reselect the travel path. If the travel path is not reselected, there is a possibility that the subject vehicle 100A may travel on an inappropriate travel path.

In step S103, the driving support controller 2 generates the third prediction path PT3 (see FIG. 3) based on the first prediction path PT1 and the second prediction path PT2.

Then, in step S104, the driving support controller 2 selects the third prediction path PT3 as the travel path of the subject vehicle 100A.

In step S105, the driving support controller 2 executes a reliability determination process with respect to the first prediction path PT1 and the second prediction path PT2. The reliability determination process involves determining whichever one of the first prediction path PT1 and the second prediction path PT2 has higher reliability. A specific processing example will be described later with reference to another flowchart.

In step S106, the driving support controller 2 determines whether the first prediction path PT1 has higher reliability than the second prediction path PT2. If it is determined that the first prediction path PT1 has higher reliability than the second prediction path PT2, the driving support controller 2 proceeds to step S107 to select the first prediction path PT1 as the travel path.

In contrast, if it is determined that the first prediction path PT1 does not have higher reliability than the second prediction path PT2, the driving support controller 2 proceeds to step S108 to select the second prediction path PT2 as the travel path.

Figure 11:
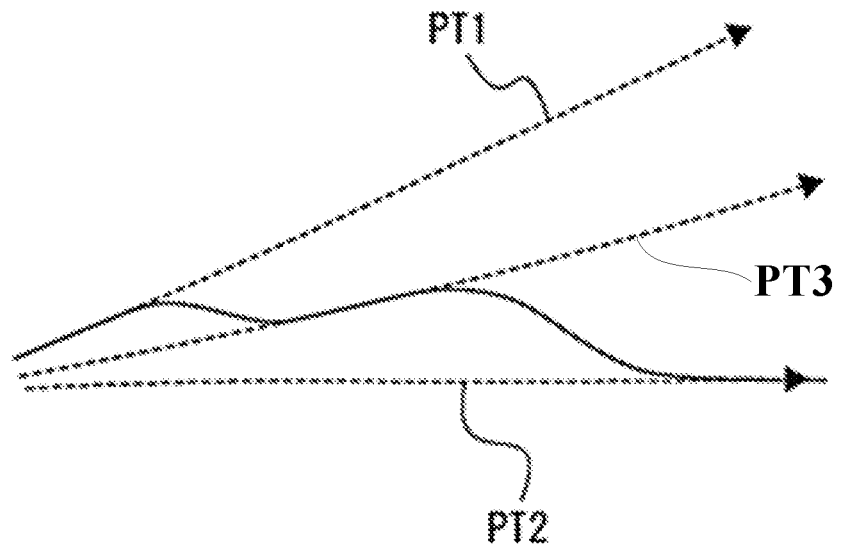
FIG. 11 illustrates the behavior of a subject vehicle when travel paths are changed with the intervention of the third prediction path.
Figure 12:
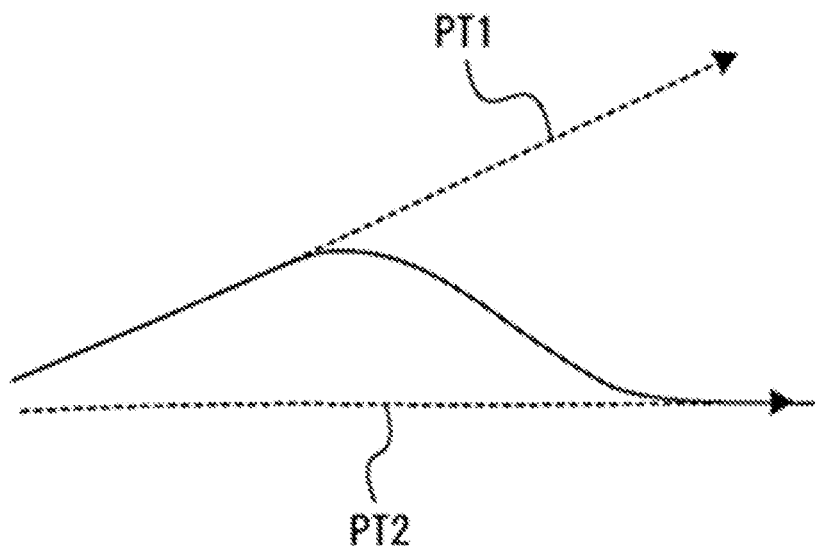
FIG. 12 illustrates the behavior of the subject vehicle when travel paths are changed without the intervention of the third prediction path.

When it is determined that there is a divergence of a predetermined amount or more between the first prediction path PT1 and the second prediction path PT2 in this manner, the reliability levels of the first prediction path PT1 and the second prediction path PT2 are determined while the third prediction path PT3 is selected as the travel path, and the prediction path with the higher reliability is then selected as the travel path. Consequently, as illustrated in, for example, FIG. 11, after the travel path is changed from the first prediction path PT1 to the third prediction path PT3, the travel path is further changed to the second prediction path PT2. The behavior of the subject vehicle 100A when the travel path is changed from the first prediction path PT1 to the third prediction path PT3 and the behavior of the subject vehicle 100A when the travel path is changed from the third prediction path PT3 to the second prediction path PT2 change gradually, as compared with a case where the travel path is changed directly from the first prediction path PT1 to the second prediction path PT2, as illustrated in FIG. 12. Accordingly, the steering amount is reduced for each change of the travel path, thereby stabilizing the behavior of the subject vehicle 100A and allowing the subject vehicle 100A to travel without giving a sense of discomfort and a sense of danger to drivers of nearby vehicles.

The reliability determination process involves determining the reliability by using leading vehicle information. Therefore, the leading vehicle 100B is to be detected for executing the reliability determination process. If the leading vehicle 100B is not detected, the reliability determination process in step S105 is not to be executed. Accordingly, the third prediction path PT3 may be continuously selected without the execution of the determination process in step S106. Alternatively, the reliability determination process may be additionally executed without using leading vehicle information, and step S106, step S107, and step S108 may be executed in accordance with the obtained result.

Figure 13:
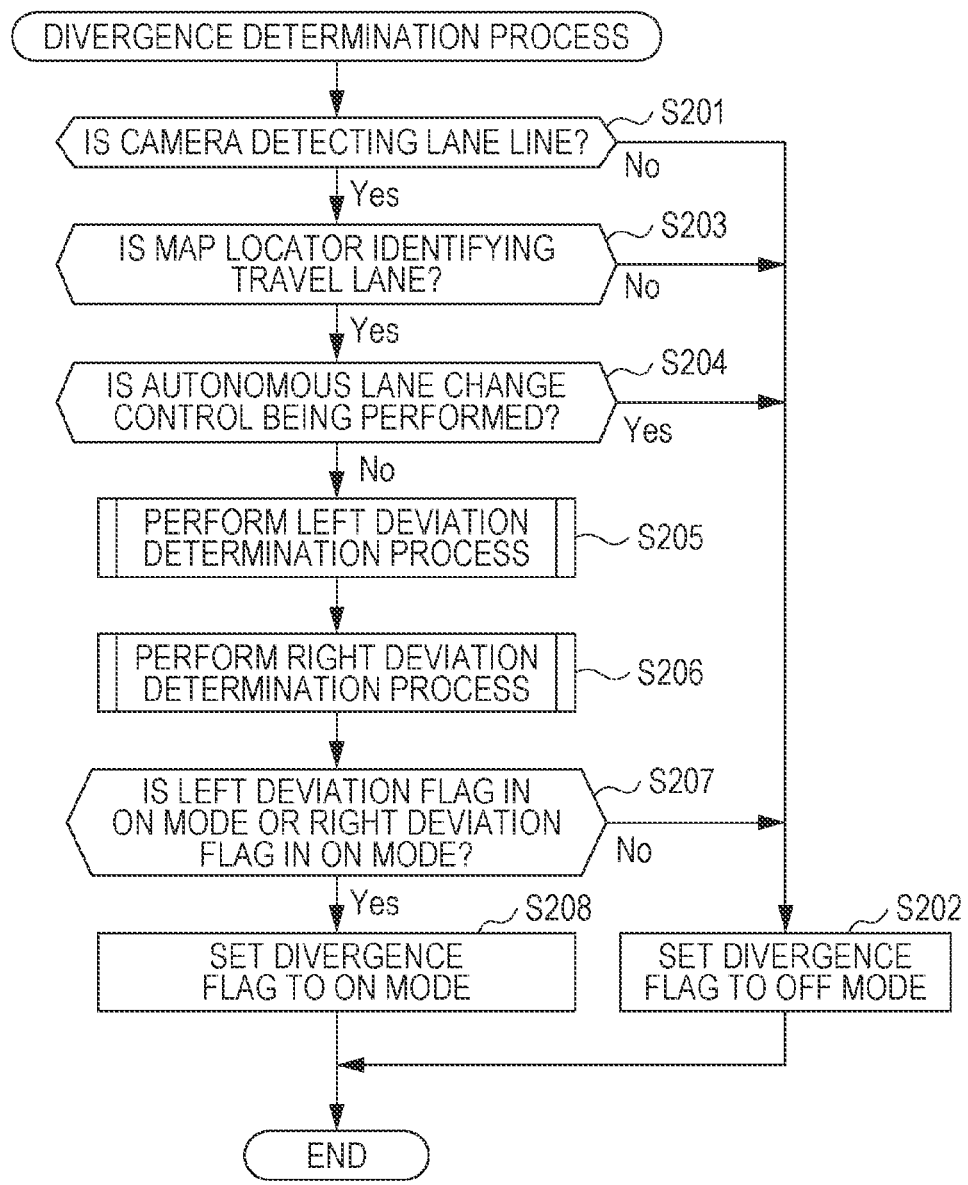
FIG. 13 is a flowchart illustrating an example of the divergence determination process.

A specific processing example of the divergence determination process in step S101 in FIG. 8 will now be described with reference to FIG. 13. The divergence determination process illustrated in FIG. 13 is to be executed periodically every several milliseconds to several hundred milliseconds. It is determined whether a divergence has occurred between the first prediction path PT1 and the second prediction path PT2 every predetermined time period.

In step S201, the driving support controller 2 determines whether the stereo camera 18 is detecting a lane line.

If the stereo camera 18 is not detecting a lane line, that is, if a lane line is not detectable in image processing by the image processor 19 subsequent to the stereo camera 18, the driving support controller 2 proceeds to step S202 to set the divergence flag to the OFF mode, and ends the series of processes illustrated in FIG. 13. In this case, divergence determination is not possible since it is not possible to generate the second prediction path PT2.

In contrast, if the stereo camera 18 is detecting a lane line in step S201, that is, if a lane line is being detected in accordance with image processing by the image processor 19 subsequent to the stereo camera 18, the driving support controller 2 proceeds to step S203 to determine whether the map locator 4 is identifying the travel lane of the subject vehicle 100A.

If the map locator 4 is not identifying the travel lane, it is not possible to generate the first prediction path PT1. Thus, the driving support controller 2 proceeds to step S202 to set the divergence flag to the OFF mode.

In contrast, if the map locator 4 is identifying the travel lane in step S203, the driving support controller 2 proceeds to step S204 to determine whether autonomous lane change control is being performed.

Autonomous lane change control involves, for example, autonomously changing travel lanes when a turn signal indicator is operated during the hands-off driving mode. This control involves detecting another vehicle traveling on a travel lane serving as a lane change destination and executing steering control.

When the autonomous lane change control is being performed, it is assumed that there is no problem even if the subject vehicle 100A deviates from the lane line being detected. Thus, the driving support controller 2 sets the divergence flag to the OFF mode in step S202 and ends the divergence determination process.

If it is determined in step S204 that the autonomous lane change control is not being performed, the driving support controller 2 proceeds to step S205 to execute a left deviation determination process, and then proceeds to step S206 to execute a right deviation determination process.

The left deviation determination process involves determining whether the left edge 100EL of the subject vehicle 100A is to deviate from the left lane line WLL by a predetermined amount or more (i.e., whether the left edge 100EL is to deviate from the left lane line WLL after a predetermined time period).

Likewise, the right deviation determination process involves determining whether the right edge 100ER of the subject vehicle 100A is to deviate from the right lane line WLR by a predetermined amount or more.

The left deviation determination process and the right deviation determination process are realizable with the same process of simply interchanging the left and right sides of the subject vehicle 100A. Thus, an example of the left deviation determination process will be described with reference to FIG. 14, whereas a description for the right deviation determination process will be omitted.

In step S301, the driving support controller 2 calculates a left deviation amount.

Figure 15:
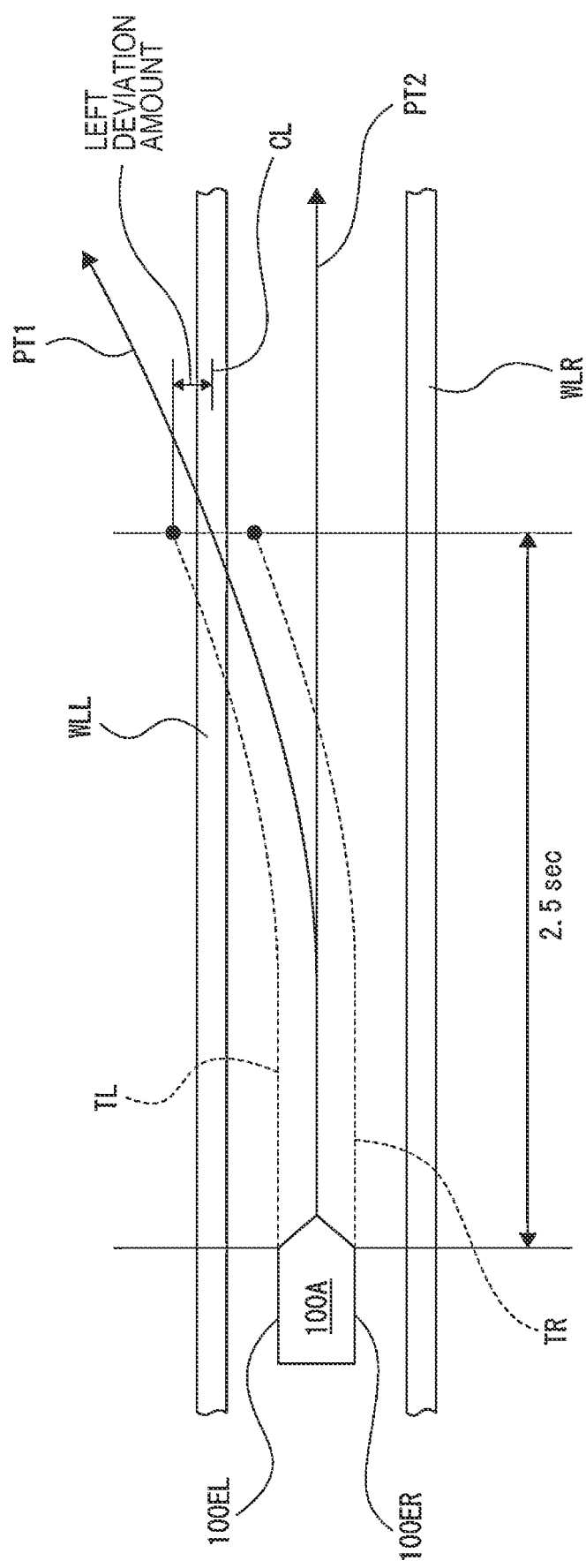
FIG. 15 illustrates a calculation example of a left deviation amount.

An example of the calculated left deviation amount is illustrated in FIG. 15. In FIG. 15, lane lines indicated as white lines denote the left lane line WLL and the right lane line WLR recognized by the image processor 19 and serving as lane lines to the left and the right of the subject vehicle 100A. Furthermore, in FIG. 15, the first prediction path PT1 and the second prediction path PT2 are illustrated. Moreover, the left trajectory TL serving as a movement trajectory of the left edge 100EL of the subject vehicle 100A and the right trajectory TR serving as a movement trajectory of the right edge 100ER are also illustrated.

As illustrated in FIG. 15, the left deviation amount for the left edge 100EL of the subject vehicle 100A after a predetermined time period (e.g., after 2.5 seconds) corresponds to a distance between a center line CL of the left lane line WLL and the position of the left edge 100EL after the predetermined time period.

The left deviation amount can be calculated from, for example, the vehicle width of the subject vehicle 100A, the position of the subject vehicle 100A in the lane width direction, the lane width of the travel lane, the curvature of the travel lane, the speed and acceleration of the subject vehicle 100A, and the yaw angle of the subject vehicle 100A relative to the travel lane. The left deviation amount may be calculated by using positional information of the left edge 100EL of the subject vehicle 100A or by using information about the center position of the subject vehicle 100A in the vehicle width direction.

Alternatively, the left deviation amount may be calculated by using various kinds of information other than those mentioned above. One example is an actual steering angle of the subject vehicle 100A. Furthermore, for calculating (i.e., estimating) the yaw angle, an output value from the yaw rate sensor 16e may be used.

Figure 14:
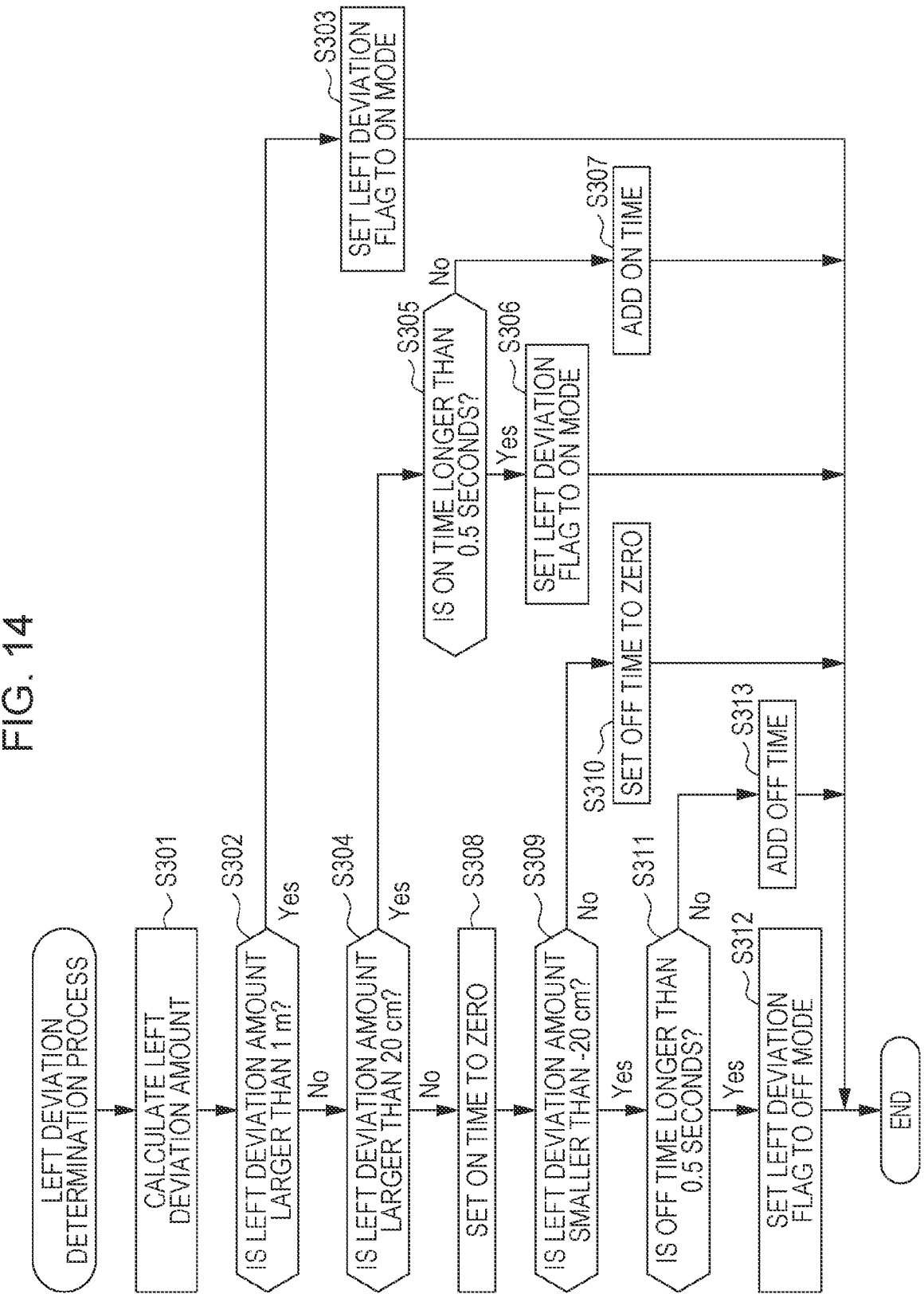
FIG. 14 is a flowchart illustrating an example of a left deviation determination process.

Referring back to the flowchart in FIG. 14, the driving support controller 2 determines in step S302 whether the left deviation amount is larger than a first threshold value (e.g., 1 m). If it is determined that the left deviation amount is larger than the first threshold value (1 m), the driving support controller 2 sets a left deviation flag to the ON mode in step S303 and ends the left deviation determination process since the left deviation amount is large.

In contrast, if it is determined that the left deviation amount is smaller than or equal to the first threshold value (1 m), the driving support controller 2 proceeds to step S304 to determine whether the left deviation amount is larger than a second threshold value (e.g., 20 cm). If the left deviation amount is larger than the second threshold value (20 cm), that is, if the left deviation amount is larger than the second threshold value (20 cm) and smaller than or equal to the first threshold value (1 m), the driving support controller 2 determines in step S305 whether an ON time variable is larger than 0.5 seconds.

The ON time variable and an OFF time variable will now be described. The ON time variable is a variable in which a time period elapsed from an occurrence of a situation where the left deviation flag is to be set to the ON mode is stored. The OFF time variable is a variable in which a time period elapsed from an occurrence of a situation where the left deviation flag is to be set to the OFF mode is stored.

A situation where it is determined in step S304 that the left deviation amount is larger than 20 cm is a situation where at least the left edge 100EL of the subject vehicle 100A is located outside the left lane line WLL. Therefore, such a situation may be regarded as a situation where the left deviation flag is to be set to the ON mode.

If the left deviation amount is larger than 20 cm in step S304, it is determined in step S305 whether the ON time variable is larger than a predetermined time period (e.g., 0.5 seconds). If the ON time variable is larger than the predetermined time period (0.5 seconds), the driving support controller 2 sets the left deviation flag to the ON mode in step S306 and ends the left deviation determination process.

In contrast, if it is determined in step S305 that the ON time variable is smaller than or equal to the predetermined time period (0.5 seconds), the driving support controller 2 performs a process for adding the ON time variable in step S307 and ends the left deviation determination process. Accordingly, if step S305 is to be subsequently executed while the left edge 100EL of the subject vehicle 100A continues to slightly deviate from the lane line, the left deviation flag can be readily set to the ON mode.

As the process illustrated in FIG. 13 is executed periodically every predetermined time period, the left deviation determination process illustrated in FIG. 14 is executed at similar processing intervals.

Therefore, the ON-time adding process in step S307 and an OFF-time adding process in step S313, to be described later, are repeatedly executed until the ON time variable and the OFF time variable exceed the predetermined time period (0.5 seconds), and if the ON time variable and the OFF time variable exceed the predetermined time period (0.5 seconds), the ON/OFF setting of the left deviation flag is switched in step S306 and step S312.

If it is determined in step S304 that the left deviation amount is smaller than or equal to the second threshold value (20 cm), the driving support controller 2 resets the ON time variable to zero in step S308 since the left deviation amount is small.

Subsequently, the driving support controller 2 determines in step S309 whether the left deviation amount is smaller than a third threshold value. The third threshold value is a numerical value of, for example, −20 cm. If the deviation amount is a negative value, an edge of the subject vehicle 100A is located outside a lane line.

That is, the third threshold value is used for determining whether the left edge 100EL of the subject vehicle 100A is located inside the left lane line WLL. A situation where the left deviation amount is smaller than the third threshold value (−20 cm) indicates a situation where the left edge 100EL of the subject vehicle 100A still has an extra allowance until the left edge 100EL passes over the left lane line WLL.

If the left deviation amount is larger than or equal to the third threshold value (−20 cm), that is, if the left deviation amount is between the third threshold value (−20 cm) and the second threshold value (20 cm) inclusive, the left edge 100EL of the subject vehicle 100A runs along near the left lane line WLL, so that the driving support controller 2 resets the OFF time variable to zero in step S310 and ends the left deviation determination process.

In contrast, if the left deviation amount is smaller than the third threshold value (−20 cm), the left edge 100EL of the subject vehicle 100A still has an extra allowance until the left edge 100EL passes over the left lane line WLL, so that the driving support controller 2 determines in step S311 that the OFF time variable is larger than or equal to the predetermined time period (e.g., 0.5 seconds).

If the OFF time variable is larger than or equal to the predetermined time period (e.g., 0.5 seconds), the driving support controller 2 proceeds to step S312 to set the left deviation flag to the OFF mode, and then ends the left deviation determination process.

In contrast, if the OFF time variable is smaller than the predetermined time period, the driving support controller 2 proceeds to step S313 to perform the process for adding the OFF time variable, and then ends the left deviation determination process.

Referring back to the flowchart in FIG. 13, after completing the left deviation determination process and the right deviation determination process in step S205 and step S206, the driving support controller 2 determines in step S207 whether at least either one of the left deviation flag and the right deviation flag is in the ON mode. If both flags are in the OFF mode, the driving support controller 2 sets the divergence flag to the OFF mode in step S202 and ends the divergence determination process.

If either one of the deviation flags is in the ON mode, the driving support controller 2 sets the divergence flag to the ON mode in step S208 and ends the divergence determination process.

Figure 16:
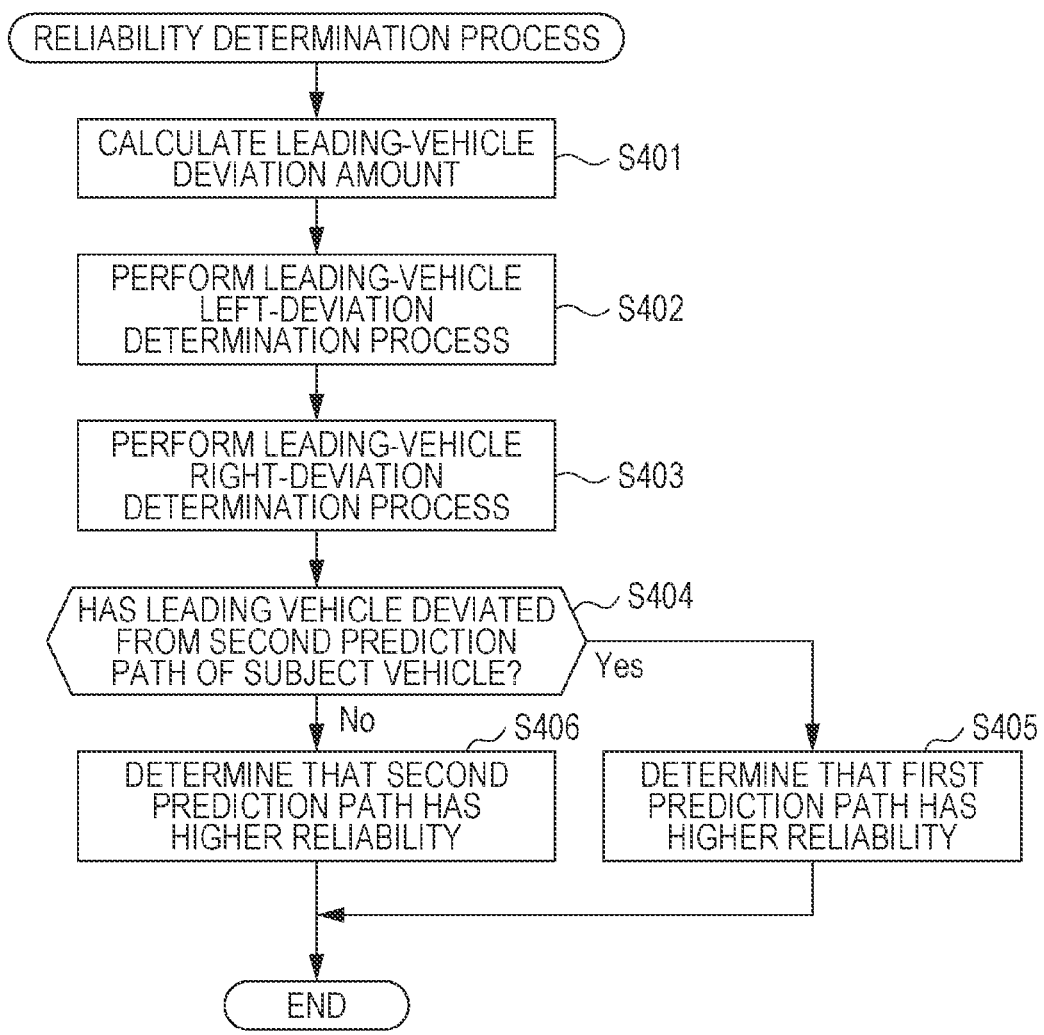
FIG. 16 is a flowchart illustrating an example of a reliability determination process.

FIG. 16 illustrates an example of the reliability determination process in step S105 in FIG. 8.

The reliability determination process involves determining whether either one of the first prediction path PT1 and the second prediction path PT2 is appropriate when a divergence of a predetermined amount or more occurs between the prediction paths. In the reliability determination process, the reliability is determined by using leading vehicle information.

In step S401, the driving support controller 2 performs a leading-vehicle deviation-amount calculation process. A leading-vehicle deviation amount can be calculated using a technique similar to that used for the left deviation amount of the subject vehicle 100A calculated in step S301 in FIG. 14. In detail, the leading-vehicle deviation amount can be calculated by replacing the information, such as the vehicle width, the position in the lane width direction, the speed and acceleration, and the yaw angle relative to the travel lane, about the subject vehicle 100A used for the calculation in step S301 in FIG. 14 with information about the leading vehicle 100B. Furthermore, although the left deviation amount calculated with respect to the subject vehicle 100A is a deviation amount with respect to a predicted location of the subject vehicle 100A after 2.5 seconds, the leading-vehicle deviation amount is calculated by using the location of the leading vehicle 100B relative to the current location of the subject vehicle 100A.

In step S402, the driving support controller 2 performs a leading-vehicle left-deviation determination process.

The leading-vehicle left-deviation determination process involves determining whether the left edge of the leading vehicle 100B is currently passing over the left lane line WLL recognized by the subject vehicle 100A.

Figure 17:
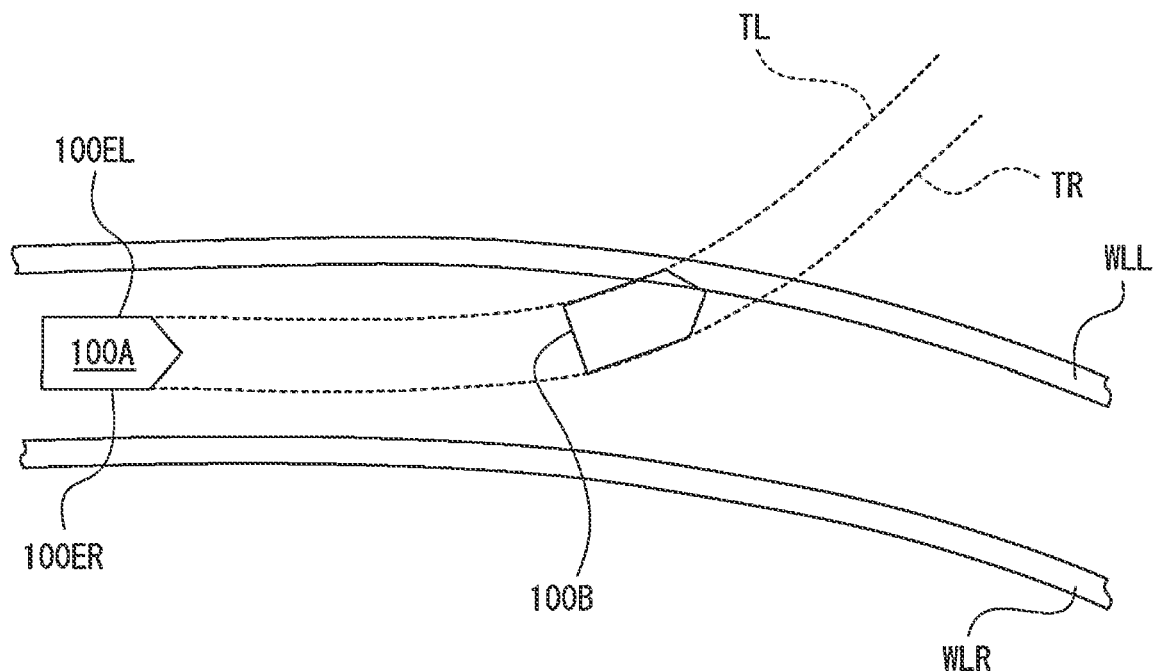
FIG. 17 illustrates a state where a leading vehicle has deviated from the second prediction path of the subject vehicle.

A state where the left edge of the leading vehicle 100B is passing over the left lane line WLL recognized by the subject vehicle 100A is as illustrated in FIG. 17.

Subsequently, in step S403, the driving support controller 2 performs a leading-vehicle right-deviation determination process. The leading-vehicle right-deviation determination process involves determining whether the right edge of the leading vehicle 100B is currently passing over the right lane line WLR recognized by the subject vehicle 100A.

In step S404, the driving support controller 2 determines whether the leading vehicle 100B has deviated from the second prediction path PT2 of the subject vehicle 100A.

Examples of a state where the leading vehicle 100B has deviated from the second prediction path PT2 include a state where the left edge of the leading vehicle 100B is passing over the left lane line WLL (see FIG. 17) and a state where the right edge of the leading vehicle 100B is passing over the right lane line WLR.

In such a case, it is determined that the leading vehicle 100B has deviated from the second prediction path PT2, and the driving support controller 2 determines in step S405 that the first prediction path PT1 has higher reliability than the second prediction path PT2.

Figure 18:
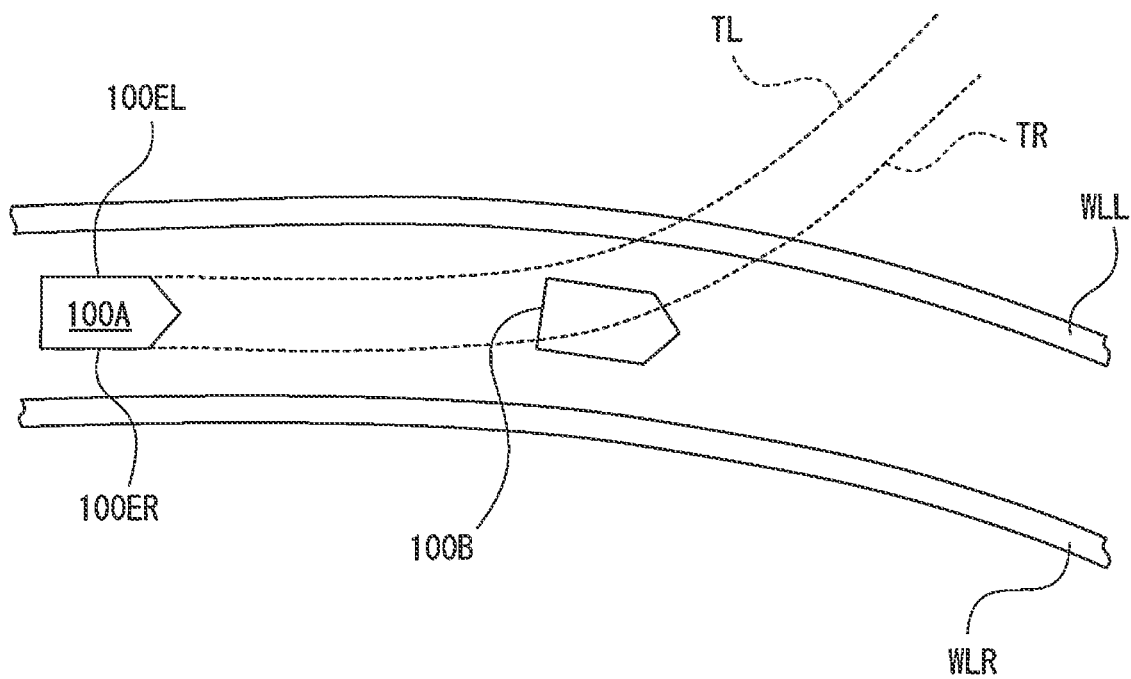
FIG. 18 illustrates a state where the leading vehicle has deviated from the first prediction path of the subject vehicle.

In contrast, if it is determined that the leading vehicle 100B has not deviated from the second prediction path PT2 of the subject vehicle 100A, that is, if it is determined that the leading vehicle 100B has passed over either one of the left trajectory TL of the left edge 100EL of the subject vehicle 100A and the right trajectory TR of the right edge 100ER by a predetermined amount or more (see FIG. 18), the driving support controller 2 proceeds to step S406 to determine that the second prediction path PT2 has higher reliability than the first prediction path PT1.

As an alternative to determining whether the leading vehicle 100B has passed over either one of the left trajectory TL of the left edge 100EL of the subject vehicle 100A and the right trajectory TR of the right edge 100ER by a predetermined amount or more, it may be determined whether the leading vehicle 100B has passed over either one of the left and right lane lines of the first prediction path PT1 identified from the map locator 4.

The series of processes illustrated in FIG. 16 is executed under conditions where the stereo camera 18 and the image processor 19 of the subject vehicle 100A are properly detecting the lane lines and the leading vehicle 100B, and the map locator 4 is appropriately detecting the travel lane.

In other words, if any of these pieces of information is not properly detected, a transition may be made to the hands-on request mode MD3 without performing the reliability determination process.

Although the third prediction path PT3 is generated from two prediction paths, namely, the first prediction path PT1 and the second prediction path PT2, in the above example, another method is also conceivable. For example, a third control value for allowing the subject vehicle 100A to travel on the third prediction path PT3 may be generated from a first control value (e.g., either one of a steering amount and a steering angle) for vehicle control to be applied to the subject vehicle 100A for allowing the subject vehicle 100A to travel on the first prediction path PT1 and a second control value for vehicle control to be applied to the subject vehicle 100A for allowing the subject vehicle 100A to travel on the second prediction path PT2, and the driving support control of the subject vehicle 100A may be performed based on the third control value.

The vehicle control system 1 described above includes a first prediction path generator (i.e., the first prediction path generator 32) that generates a prediction path of the subject vehicle 100A as the first prediction path PT1 based on map information and positional information of the subject vehicle 100A, a second prediction path generator (i.e., the second prediction path generator 33) that generates a prediction path of the subject vehicle 100A as the second prediction path PT2 based on external environment information acquired from an external environment recognizer (i.e., the external environment recognizer 3) recognizing an external travel environment of the subject vehicle 100A, a leading-vehicle-information acquiring unit (i.e., the leading-vehicle-information acquiring unit 35) that acquires information related to a travel path of the leading vehicle 100B as leading vehicle information, a divergence determining unit (i.e., the divergence determining unit 36) that determines whether a divergence of a predetermined amount or more has occurred between the first prediction path PT1 and the second prediction path PT2, a reliability determining unit (i.e., the reliability determining unit 37) that determines reliability of each of the first prediction path PT1 and the second prediction path PT2 based on the leading vehicle information if the determination result indicates that the divergence of the predetermined amount or more has occurred between the first prediction path PT1 and the second prediction path PT2, and a travel path selector (i.e. the travel path selector 38) that selects a travel path of the subject vehicle 100A based on the reliability of each prediction path.

If a divergence has occurred between the first prediction path PT1 and the second prediction path PT2, it is desirable that a more appropriate prediction path be selected as the travel path.

According to this configuration, a path similar to the path on which the leading vehicle is traveling is selected as the prediction path with the higher reliability from the two prediction paths, thereby at least preventing a non-travelable path from being selected as the travel path. Accordingly, the driving safety of the subject vehicle 100A can be ensured.

The vehicle control system 1 may further include a third prediction path generator (i.e., the third prediction path generator 34) that generates the third prediction path PT3 based on the first prediction path PT1 and the second prediction path PT2, and the travel path selector (i.e., the travel path selector 38) may be capable of selecting the third prediction path PT3 as the travel path of the subject vehicle 100A.

Either one of the first prediction path PT1 and the second prediction path PT2 may possibly be an inappropriate path.

If the selected prediction path is an inappropriate path, there is a possibility that safety may be impaired. In this configuration, the third prediction path PT3 is generated based on the first prediction path PT1 and the second prediction path PT2, and the third prediction path PT3 is selectable as the travel path. Accordingly, the number of options is increased, thereby allowing for a safer path selection.

In a case where the vehicle control system 1 determines that the divergence of the predetermined amount or more has occurred between the first prediction path PT1 and the second prediction path PT2, the travel path selector (i.e., the travel path selector 38) may select the third prediction path PT3 as the travel path of the subject vehicle 100A before the reliability determination is performed, and may select the prediction path with the higher reliability as the travel path of the subject vehicle 100A from the first prediction path PT1 and the second prediction path PT2 after the reliability determination is performed.

The third prediction path PT3 is, for example, more appropriate than at least either one of the first prediction path PT1 and the second prediction path PT2.

Until the reliability determination is performed, the third prediction path PT3 is selected as the travel path, so that the most inappropriate prediction path is not selected. This contributes to enhanced safety. When the prediction path with the higher reliability is determined, the prediction path with the higher reliability is selected as the travel path, thereby achieving enhanced safety.

The divergence determining unit (i.e., the divergence determining unit 36) in the vehicle control system 1 may determine that the divergence of the predetermined amount or more has occurred if a predicted location of the subject vehicle 100A after traveling for a predetermined time period (e.g., after 2.5 seconds) or a predetermined distance on the first prediction path PT1 and a predicted location of the subject vehicle 100A after traveling for a predetermined time period or a predetermined distance on the second prediction path PT2 are separated from each other by a predetermined distance or more.

This determination is performed before the subject vehicle 100A reaches either one of the predicted locations on the respective prediction paths.

Therefore, the travel path can be selected before the subject vehicle 100A is actually located away from an optimal travel path by a predetermined distance or more. Accordingly, the subject vehicle 100A can be prevented from being located away from the optimal travel path by the predetermined distance or more, thereby achieving enhanced safety.

In the vehicle control system 1, the third prediction path PT3 may be a path extending through an intermediate point between a predicted location of the subject vehicle 100A after traveling for a predetermined time period or a predetermined distance on the first prediction path PT1 and a predicted location of the subject vehicle 100A after traveling for a predetermined time period or a predetermined distance on the second prediction path PT2.

In a case where either one of the first prediction path PT1 and the second prediction path PT2 is the optimal path, if the other prediction path is selected, the subject vehicle 100A may possibly travel along a position located away from the optimal path by a predetermined distance or more. In such a case, an intermediate path between the first prediction path PT1 and the second prediction path PT2 is generated and selected as the third prediction path PT3, so that the divergence from the optical path can be reduced to half.

Accordingly, the traveling position of the subject vehicle 100A can be offset toward the optimal path, thereby achieving enhanced safety. Moreover, the distance by which the subject vehicle 100A is to move laterally when the third prediction path PT3 is to be changed to the optimal prediction path can be shortened, so that the behavior of the subject vehicle 100A can be stabilized. Furthermore, sudden braking and sudden steering of the subject vehicle 100A can be suppressed, so that the safety of not only the subject vehicle 100A but also nearby vehicles can be enhanced. In addition, improved ride quality can also be achieved.

The vehicle control system 1 described above includes a first prediction path generator (i.e., the first prediction path generator 32) that generates a prediction path of the subject vehicle 100A as the first prediction path PT1 based on map information and positional information of the subject vehicle 100A, a second prediction path generator (i.e., the second prediction path generator 33) that generates a prediction path of the subject vehicle 100A as the second prediction path PT2 based on external environment information acquired from an external environment recognizer (i.e., the external environment recognizer 3) recognizing an external travel environment of the subject vehicle 100A, a third prediction path generator (i.e., the third prediction path generator 34) that generates the third prediction path PT3 based on the first prediction path PT1 and the second prediction path PT2, an assist travel controller (i.e., the assist travel controller 31) that performs hands-off driving in which a driver is not to perform steering or course-keeping, a divergence determining unit (i.e., the divergence determining unit 36) that determines whether a divergence of a predetermined amount or more has occurred between the first prediction path PT1 and the second prediction path PT2, a transition controller (i.e., the transition controller 39) that transitions from the hands-off driving (i.e., the hands-off driving mode MD2) to hands-on driving (i.e., the hands-on driving mode MD1) if the determination result indicates that the divergence of the predetermined amount or more has occurred between the first prediction path PT1 and the second prediction path PT2, and a travel path selector (i.e. the travel path selector 38) that selects the third prediction path PT3 as the travel path of the subject vehicle 100A during the transition from the hands-off driving to the hands-on driving.

A conceivable situation where a divergence has occurred between the first prediction path PT1 and the second prediction path PT2 is a case where either one of the map information and the external environment information has decreased in accuracy or is wrong. In such a case, it may possibly be inappropriate to continue with the hands-off driving of the subject vehicle 100A based on either one of the prediction paths. In this configuration, the transition is made from the hands-off driving to the hands-on driving, and the third prediction path PT3 is selected.

This can increase the possibility in which the subject vehicle 100A can travel on a more appropriate path than the inappropriate prediction path selected from the first prediction path PT1 and the second prediction path PT2. Moreover, by allowing the subject vehicle 100A to travel along the third prediction path PT3, the distance and time can be extended until the subject vehicle 100A travels on an inappropriate travel path, thereby gaining time until the driver performs steering or course-keeping. Accordingly, this can increase the possibility in which the driver performs steering or course-keeping until a transition is made to the aforementioned MRM execution mode MD4, thereby increasing the possibility of not stopping the subject vehicle 100A.

In the vehicle control system 1, the third prediction path PT3 may be a path extending through an intermediate point between a predicted location of the subject vehicle 100A after traveling for a predetermined time period or a predetermined distance on the first prediction path PT1 and a predicted location of the subject vehicle 100A after traveling for a predetermined time period or a predetermined distance on the second prediction path PT2.

In a case where either one of the first prediction path PT1 and the second prediction path PT2 is the optimal path, the third prediction path PT3 is a path offset toward the optimal path relative to a non-optimal path serving as the other prediction path.

Accordingly, the traveling position of the subject vehicle 100A can be set toward the optimal path, thereby achieving enhanced safety. Moreover, the distance by which the subject vehicle 100A is to move laterally when the third prediction path PT3 is to be changed to the optimal prediction path can be shortened, so that the behavior of the subject vehicle 100A can be stabilized. Furthermore, sudden braking and sudden steering of the subject vehicle 100A can be suppressed, so that the safety of not only the subject vehicle 100A but also nearby vehicles can be enhanced. In addition, improved ride quality can also be achieved.

In a state where the third prediction path PT3 is selected as the travel path, if either one of the first prediction path PT1 and the second prediction path PT2 is determined as being a proper path, the travel path selector (i.e., the travel path selector 38) in the vehicle control system 1 may select the prediction path determined as being the proper path as the travel path.

Thus, a situation where the subject vehicle 100A travels on the farthest path from the optimal path can be avoided, and switching to the optimal path is performed when the optimal path is determined.

Accordingly, the driving safety of the subject vehicle 100A can be enhanced. Moreover, by switching from the third prediction path PT3 to the optimal prediction path, the distance by which the subject vehicle 100A moves laterally during the switching of the paths can be reduced, thereby allowing for stable behavior of the subject vehicle 100A.

The transition controller (i.e., the transition controller 39) in the vehicle control system 1 may transition from the hands-off driving to the hands-on driving with a transition period therebetween when the transition is to be made to the hands-on driving.

Thus, a direct transition is not made from the hands-off driving to the hands-on driving in which the driver is to perform steering and course-keeping.

Accordingly, the driver can use the transition period as a preparation period for starting steering and course-keeping, thereby allowing for a smooth transition to the hands-on driving. In addition, if the transition destination is the normal driving mode MD1-1, the steering and course-keeping are not to be started immediately, thereby achieving enhanced safety of the subject vehicle 100A.

The vehicle control system 1 may further include a notifier (i.e., the notification controller 40, the display controller 6, and the display unit 11) that provides a notification for prompting the driver to perform a hands-on driving operation during the transition period.

Accordingly, the driver can appropriately recognize that the driver needs to perform steering or course-keeping.

Therefore, the driver can smoothly transition to a hands-on driving operation, thereby contributing to enhanced safety.

According to the embodiment of the disclosure, an appropriate travel path can be selected in a case where, for example, the reliability of an image of a vehicular camera is low or the reliability of map information is low.

The vehicle control system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control system 1 including the driving support controller 2, the external environment recognizer 3, the map locator 4, the communication unit 5, the display controller 6, the engine controller 7, the TM controller 8, the brake controller 9, the steering controller 10, the display unit 11, the engine-related actuator 12, the TM-related actuator 13, the brake-related actuator 14, the steering-related actuator 15, and the sensor-operator group 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle control system to be applied to a vehicle, the vehicle control system comprising:
   a camera configured to capture an image in front of the vehicle;
   an image processor configured to recognize a left lane line of the vehicle and a right lane line of the vehicle based on the image;
   a driving support controller configured to:
   generate a first prediction path and a second prediction path, each being generated on a different basis, wherein
   (i) the first prediction path is generated based on map information and positional information of the vehicle, and (ii) the second prediction path is generated based on the left lane line and the right lane line, calculate a left deviation amount and a right deviation amount in response to generating the first prediction path and the second prediction path, the left deviation amount indicating a distance by which a left edge of the vehicle departs leftward from the left lane line along the second prediction path after a predetermined time period from a current time point in a case where the vehicle travels along the first prediction path, the right deviation amount indicating a distance by which a right edge of the vehicle departs rightward from the right lane line along the second prediction path after the predetermined time period from the current time point in the case where the vehicle travels along the first prediction path;

determine whether the left deviation amount is larger than a predetermined value;

determine whether the right deviation amount is larger than the predetermined value;

generate a third prediction path, i) in response to determining that the left deviation amount is larger than the predetermined value or ii) in response to determining that the right deviation amount is larger than the predetermined value, the third prediction path extending through an intermediate point between the first prediction path and the second prediction path, the third prediction path separating from the first prediction path and the second prediction path in front of the vehicle;

select the third prediction path as a travel path of the vehicle, in response to generating the third prediction path; and select the second prediction path as the travel path of the vehicle, in response to i) determining that the left deviation amount is not larger than the predetermined value and ii) determining that the right deviation amount is not larger than the predetermined value;

an assist travel controller configured to perform hands-off driving in which a driver who drives the vehicle is not to perform steering or course-keeping based on the first prediction path and the second prediction path; and a transition controller configured to perform a transition from the hands-off driving to hands-on driving i) in response to determining that the left deviation amount is larger than the predetermined value or ii) in response to determining that the right deviation amount is larger than the predetermined value.

2. The vehicle control system according to claim 1, wherein, in a case where either one of the first prediction path and the second prediction path is determined to be a proper path in a state where the third prediction path is selected as the travel path, the driving support controller selects, as the travel path, the either one of the first prediction path and the second prediction path determined to be the proper path.

3. The vehicle control system according to claim 1, wherein the transition controller is configured to perform the transition from the hands-off driving to the hands-on driving with a transition period therebetween when the transition is to be made to the hands-on driving.

4. The vehicle control system according to claim 2, wherein the transition controller is configured to perform the transition from the hands-off driving to the hands-on driving with a transition period therebetween when the transition is to be made to the hands-on driving.

5. The vehicle control system according to claim 3, further comprising:
a display unit configured to provide a notification for prompting the driver to perform a hands-on driving operation during the transition period.

6. The vehicle control system according to claim 4, further comprising:
a display unit configured to provide a notification for prompting the driver to perform a hands-on driving operation during the transition period.

7. A vehicle control system to be applied to a vehicle, the vehicle control system comprising:
a camera configured to capture an image in front of the vehicle;
circuitry configured to:
recognize a left lane line of the vehicle and a right lane line of the vehicle based on the image;
generate a first prediction path and a second prediction path on a different basis, wherein
(i) the first prediction path is generated based on map information and positional information of the vehicle, and
(ii) the second prediction path is generated based on the left lane line and the right lane line;
perform hands-off driving in which a driver who drives the vehicle is not to perform steering or course-keeping based on the first prediction path and the second prediction path;
calculate a left deviation amount and a right deviation amount in response to generating the first prediction path and the second prediction path, the left deviation amount indicating a distance by which a left edge of the vehicle departs leftward from the left lane line along the second prediction path after a predetermined time period from a current time point in a case where the vehicle travels along the first prediction path, the right deviation amount indicating a distance by which a right edge of the vehicle departs rightward from the right lane line along the second prediction path after the predetermined time period from the current time point in the case where the vehicle travels along the first prediction path;
determine whether the left deviation amount is larger than a predetermined value;
determine whether the right deviation amount is larger than the predetermined value;
generate a third prediction path, i) in response to determining that the left deviation amount is larger than the predetermined value or ii) in response to determining that the right deviation amount is larger than the predetermined value, the third prediction path extending through an intermediate point between the first prediction path and the second prediction path, the third prediction path separating from the first prediction path and the second prediction path in front of the vehicle;
select the third prediction path as a travel path of the vehicle, in response to generating the third prediction path;
select the second prediction path as the travel path of the vehicle, in response to i) determining that the left deviation amount is not larger than the predetermined value and ii) determining that the right deviation amount is not larger than the predetermined value; and
perform a transition from the hands-off driving to hands-on driving i) in response to determining that the left deviation amount is larger than the predetermined value or ii) in response to determining that the right deviation amount is larger than the predetermined value.

8. The vehicle control system according to claim 1, wherein:
the driving support controller is configured to generate the first prediction path based on an identified travel lane on which the vehicle is traveling, the identified travel lane being identified based on the map information and the positional information of the vehicle.

9. The vehicle control system according to claim 7, wherein
the circuitry is configured to generate the first prediction path based on an identified travel lane on which the vehicle is traveling, the identified travel lane being identified based on the map information and the positional information of the vehicle.

10. The vehicle control system according to claim 1, wherein the driving support controller is further configured to:
determine whether the first prediction path has higher reliability than the second prediction path in response to selecting the third prediction path as the travel path of the vehicle;
select the first prediction path as the travel path of the vehicle in response to determining that the first prediction path has higher reliability than the second prediction path; and
select the second prediction path as the travel path of the vehicle in response to determining that the first prediction path does not have higher reliability than the second prediction path.

11. The vehicle control system according to claim 7, wherein the circuitry is further configured to:
determine whether the first prediction path has higher reliability than the second prediction path in response to selecting the third prediction path as the travel path of the vehicle;
select the first prediction path as the travel path of the vehicle in response to determining that the first prediction path has higher reliability than the second prediction path; and
select the second prediction path as the travel path of the vehicle in response to determining that the first prediction path does not have higher reliability than the second prediction path.

12. The vehicle control system according to claim 1, wherein the image processor is further configured to detect a leading vehicle in front of the vehicle based on the image, the leading vehicle running on a travel lane on which the vehicle is traveling, and
wherein the driving support controller is further configured to:
in response to i) the image processor detecting the leading vehicle and ii) selecting the third prediction path as the travel path of the vehicle, determine whether the leading vehicle is passing over the left lane line or the right lane line;
select the first prediction path as the travel path of the vehicle in response to determining that the leading vehicle is passing over the left lane line or the right lane line; and
select the second prediction path as the travel path of the vehicle in response to determining that the leading vehicle is not passing over the left lane line and the right lane line.

13. The vehicle control system according to claim 7, wherein the circuitry is further configured to:
detect a leading vehicle in front of the vehicle based on the image, the leading vehicle running on a travel lane on which the vehicle is traveling;
in response to i) detecting the leading vehicle and ii) selecting the third prediction path as the travel path of the vehicle, determine whether the leading vehicle is passing over the left lane line or the right lane line;
select the first prediction path as the travel path of the vehicle in response to determining that the leading vehicle is passing over the left lane line or the right lane line; and
select the second prediction path as the travel path of the vehicle in response to determining that the leading vehicle is not passing over the left lane line and the right lane line.

* * * * *